US011847358B2

(12) United States Patent
Anno et al.

(10) Patent No.: US 11,847,358 B2
(45) Date of Patent: Dec. 19, 2023

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventors: Makoto Anno, Tokyo (JP); Ryo Fujita, Tokyo (JP); Hirotomo Tanaka, Chiba (JP); Kosuke Tsujita, Tokyo (JP); Shou Kikuchi, Chiba (JP); Yuuki Maeda, Chiba (JP); Takaaki Yano, Tokyo (JP); Hiroyuki Toriyabe, Chiba (JP); Satoshi Yoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 31 days.

(21) Appl. No.: 17/608,954

(22) PCT Filed: Apr. 24, 2020

(86) PCT No.: PCT/JP2020/017869
§ 371 (c)(1),
(2) Date: Nov. 4, 2021

(87) PCT Pub. No.: WO2020/226083
PCT Pub. Date: Nov. 12, 2020

(65) Prior Publication Data
US 2022/0214842 A1      Jul. 7, 2022

(30) Foreign Application Priority Data
May 8, 2019   (JP) .................................. 2019-088596

(51) Int. Cl.
*G06F 3/12* (2006.01)
*G05B 19/042* (2006.01)

(52) U.S. Cl.
CPC ......... *G06F 3/1208* (2013.01); *G05B 19/042* (2013.01); *G06F 3/1253* (2013.01); *G05B 2219/2646* (2013.01); *G06F 3/1275* (2013.01)

(58) Field of Classification Search
CPC .... G06F 3/1208; G06F 3/1253; G06F 3/1275; G05B 19/042; G05B 2219/2646; G06Q 10/06395
(Continued)

(56) References Cited

U.S. PATENT DOCUMENTS

2008/0177994 A1* 7/2008 Mayer .................... G06F 16/00
                                                                    709/224
2008/0180729 A1    7/2008 Avigne et al.
(Continued)

FOREIGN PATENT DOCUMENTS

EP      2857953 A1    4/2015
EP      3113010 A1    1/2017
(Continued)

*Primary Examiner* — Darryl V Dottin
(74) *Attorney, Agent, or Firm* — Canon U.S.A., Inc., IP Division

(57) ABSTRACT

A printing system provides an efficient operation process by automating work for producing a print product that meets quality terms requested by a customer with an information format for transferring quality terms or a quality report. A control method for an information processing apparatus includes receiving order data including quality request data from an order receiving system, interpreting the received quality request data, generating a job containing information that is used for quality adjustment to be performed by a production system, based on the interpreted quality request data, and sending the job to the production system. The job containing quality request data in a data format that is same as a data format of the received quality request data is generated.

9 Claims, 16 Drawing Sheets

(58) Field of Classification Search
USPC .......................................................... 358/1.9
See application file for complete search history.

(56) References Cited

U.S. PATENT DOCUMENTS

2012/0286464 A1* 11/2012 Takei .................... B65H 1/022
271/4.01
2014/0085665 A1    3/2014 Sheldon et al.

FOREIGN PATENT DOCUMENTS

| JP | 2008009863 A | 1/2008 |
| JP | 2013246722 A | 12/2013 |
| JP | 2016096381 A | 5/2016 |
| JP | 2016150459 A | 8/2016 |

\* cited by examiner

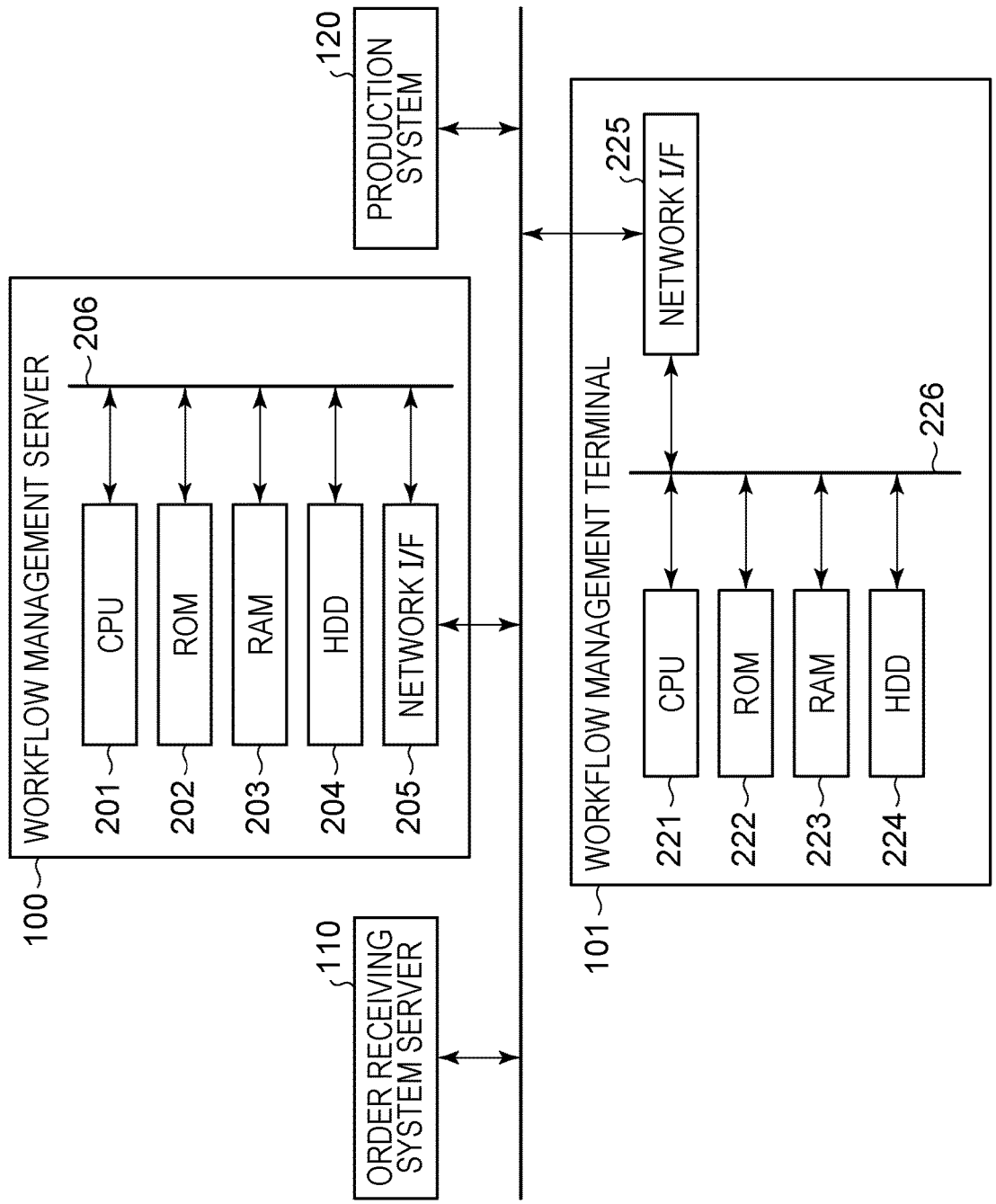

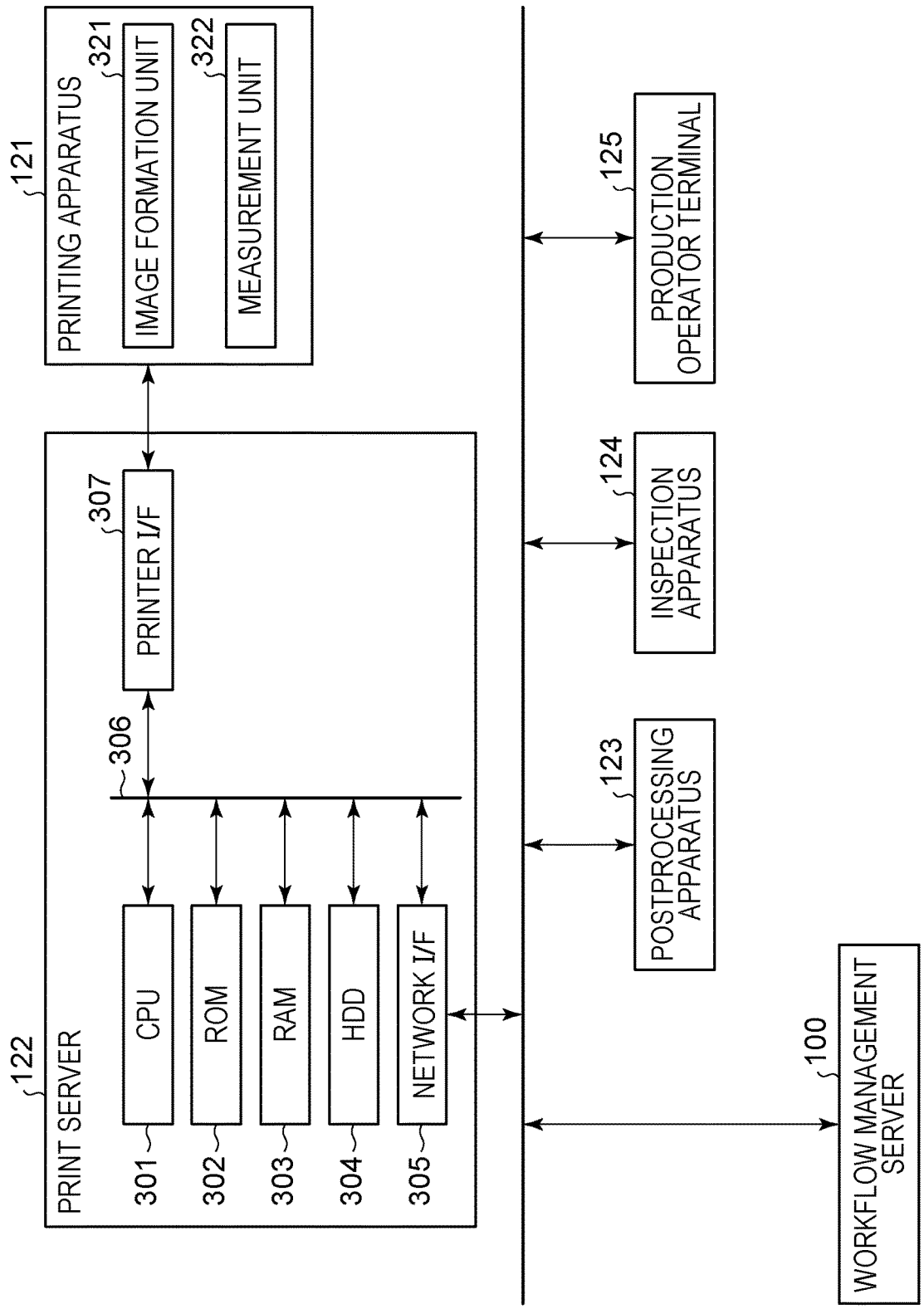

[Fig. 5A]
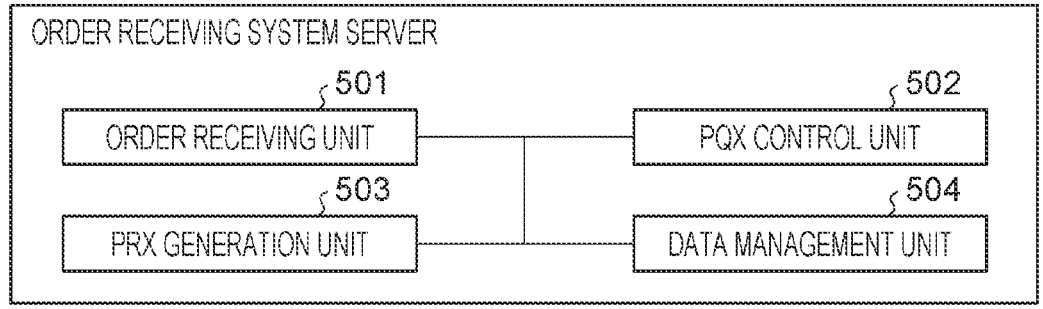
[Fig. 5B]
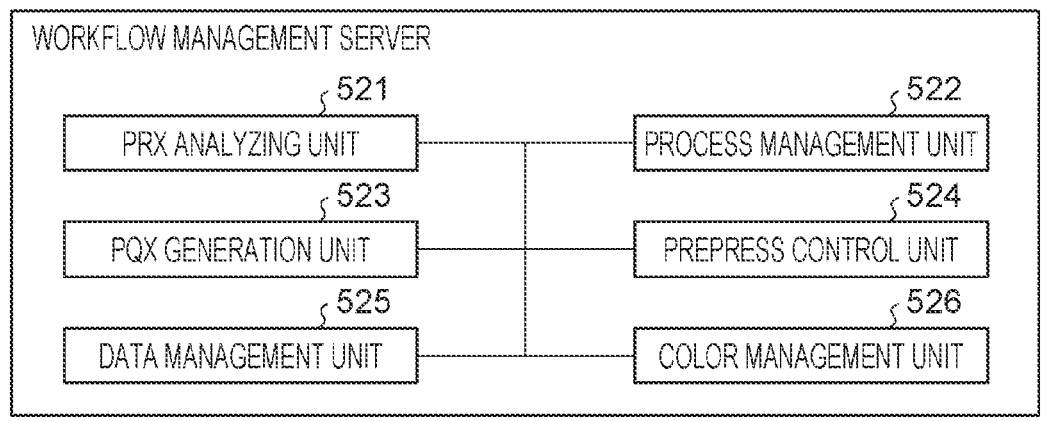
[Fig. 5C]
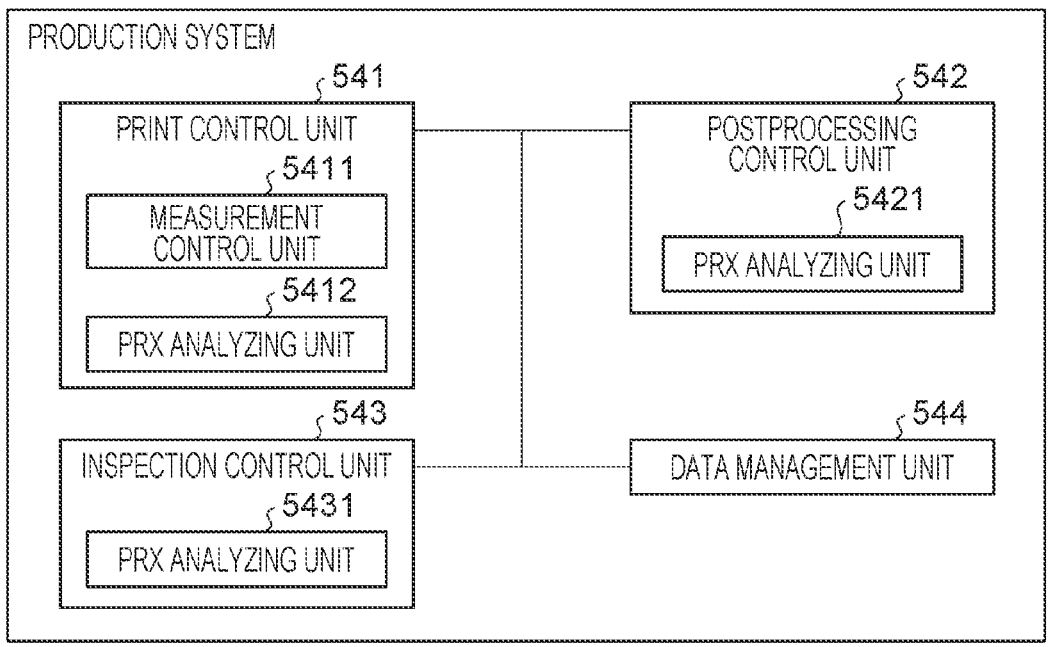

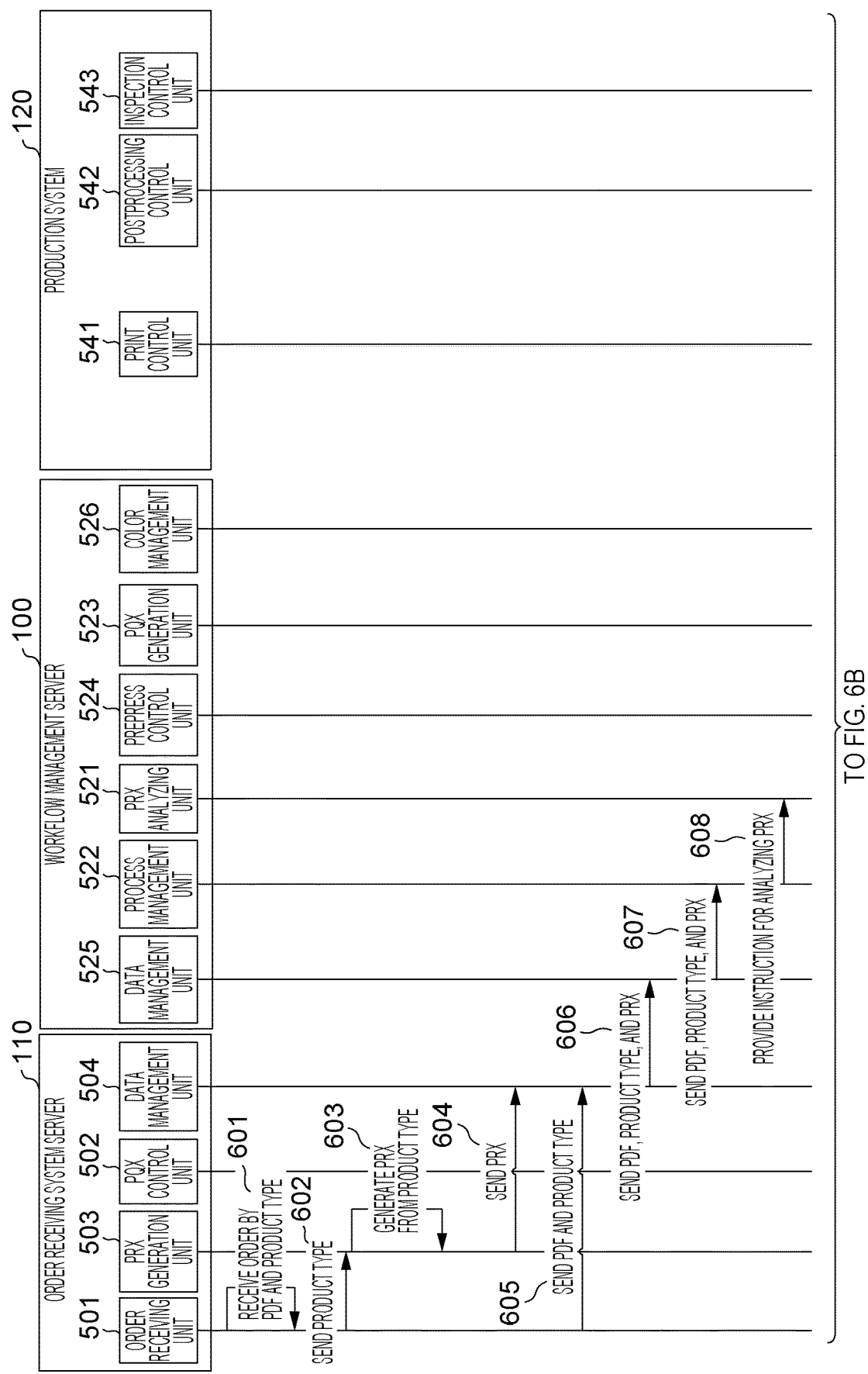

[Fig. 7]

- PrintRequirementsMessage
    - MessageInfo
    - BusinessInfo
    - QualitySpec
        - QualitySpecName/QualitySpecVersion
        - *Specifier
        - CustomerJobType/CustomerItemId
        - BasisOfCalculation
            - WeightedPercentage
            - Formula
        - OverallGradingScale
            - Grade
            - ZeroBaseline
        - MinimumAcceptableRank
        - *DesiredRank
        - QualityParameterSet
            - ParameterSetType/Name/Id
            - *WeightingFactor
            - ParameterSetScoringScale
            - MinimumAcceptableRank/*DesiredRank
            - *RequiredCompliance
            - *RequiredSamplingPositions
        - *CxFReferenceData
        - *SamplingPositionImageData
        - *TagCollection/*CustomResources

[Fig. 8]

- PrintQualityMessage
  - MessageInfo
  - PrinterInfo
  - PressRunInfo
  - InkCollection
  - ReporterCollection
  - CustomerItemCollection
  - SampleCollection
    - RunPosition
    - SamplingTime/Duration/Frequency
    - MeasurementSide
    - ColorReport
      - CustomerIdLink/PositionOnSample
      - ChartType/ChartId
      - Measurement
    - RegistrationReport
      - CustomerIdLink/PositionOnSample
      - MarkType
      - VarianceReport
      - ChannelReport
    - DefectReport
    - BarcodeReport
  - CxFSampleData
  - CxFReferenceData
  - DefectImageData
  - TagCollection/CustomResources

[Fig. 9]
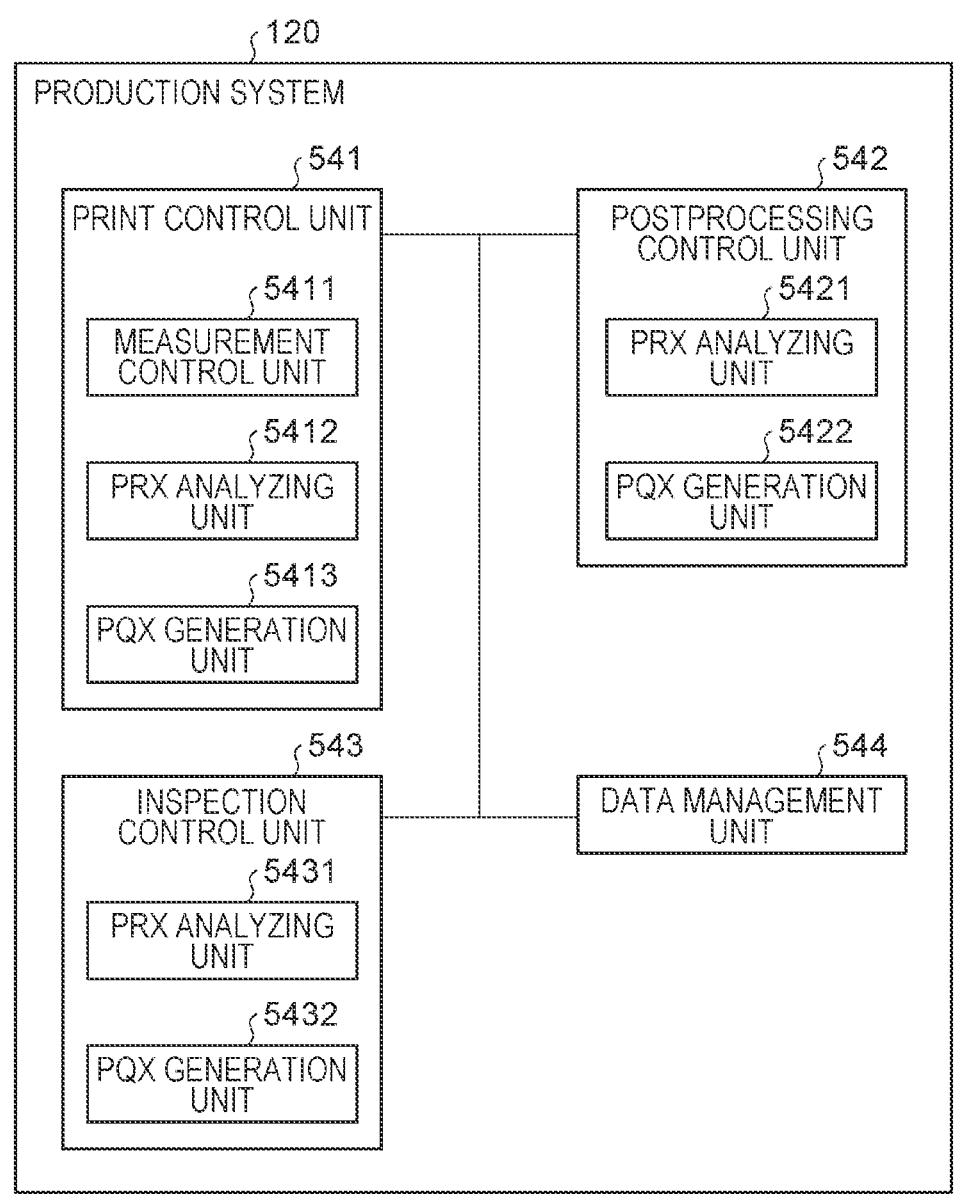

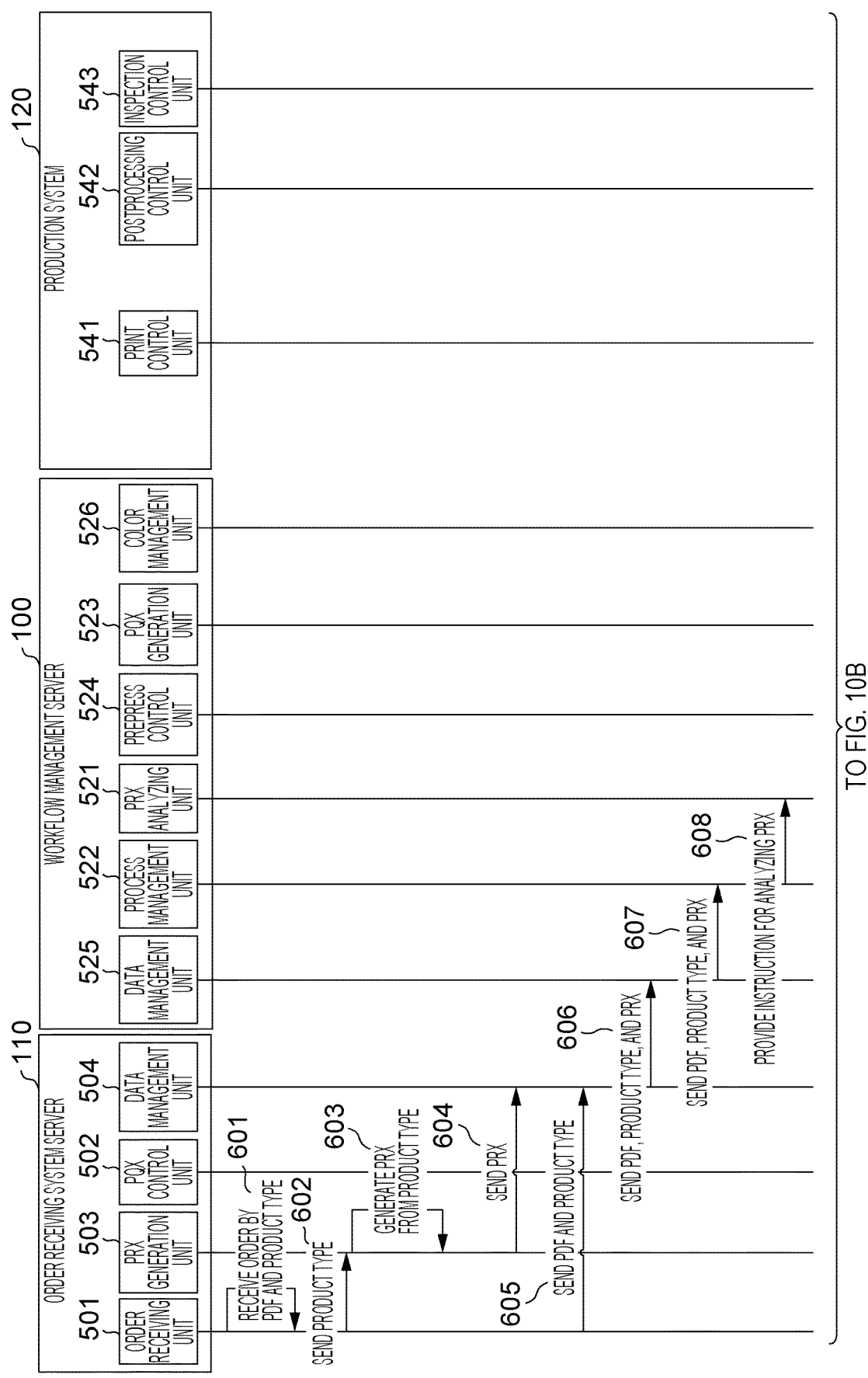

FROM FIG. 10C

INFORMATION PROCESSING APPARATUS, CONTROL METHOD FOR INFORMATION PROCESSING APPARATUS, AND STORAGE MEDIUM

TECHNICAL FIELD

The present invention relates to an information processing apparatus, a control method for an information processing apparatus, and a storage medium.

BACKGROUND ART

There are some forms of printing services called print on demand (POD), production printing, and commercial printing. In such forms of services, there are a customer (also called end user) who orders or requests printing and a printing company that provides a print product. The customer provides the requested specifications of a print product and, where necessary, image data to be used for printing to the printing company and orders printed matter. The specifications of a print product are elements that determine the details of the print product, for example, a paper type to be used, a finishing settings such as binding and stapling, and the number of sheets or sets to print. The printing company creates a print product by using the requested details and image data and delivers the print product to the customer.

In such a commercial printing service, a printing company uses various pieces of equipment and software to run operations from an order to delivery of a print product. Components for providing such a commercial printing service include a printing apparatus for printing onto sheets, a finisher for binding or stapling, an inspection apparatus for testing or inspecting printed matter, and the like. In such a commercial printing service, a Web server for accepting orders for print products from customers, and terminals and software for managing production of print products are also used. In addition, there is also a plurality of users of these apparatuses and software. Examples of the users include a person in charge of orders who manages orders received and contacts customers, a process designer who designs operation processes up to completion of print products, an operator who operates a printing apparatus and an inspection apparatus, and a checker who checks the quality of final print products. Some printing companies have a plurality of production bases. In such a case, a printing company determines which production base is used to produce a print product based on the details of an order received.

In such a commercial printing service, a printing company often receives quality terms set by a customer for a print product. Quality terms differ from the specifications of a print product and indicate terms on the quality of a print product, such as the amount of misregistration between images on both sides of a sheet, and variations in color values among multiple sets or multiple pages. Print products are a wide variety of products, such as a handout like a leaflet or a pamphlet, a photo book, a book, a business card, and an exhibit panel, and also have various applications and prices, so diverse terms or levels are desired as quality terms. As will be described later, for quality terms, a printing company needs a work process to meet the terms and a quality check process to check the quality of a print product, so the cost of a print product generally increases as the level of quality terms rises. A printing company creates a print product while performing various adjustment work to meet those quality terms. For example, based on results of sample print on which the company reaches agreement with a customer, various adjustments for matching specific colors on a specific sheet in a printing apparatus are made, and a print product that does not meet quality terms is removed as a defect through inspection after printing. A printing company checks whether the quality of a print product, achieved by these pieces of work, meets the quality terms requested by a customer and submits a quality report to the customer where necessary.

Particularly, when a printing company receives orders for print products of various specifications and quality terms from many customers, the printing company does many types of work to meet the quality terms of the customers on the print products, so the work takes a long time. For example, it is assumed that a print misregistration between both sides is set as quality terms for a print product A and matching color samples provided by a customer is set as quality terms for a print product B. In this case, a person in charge of orders transfers the quality terms of each of the print products to a process designer by using a data format that is used in a printing company. The process designer determines an operation process to meet the quality terms in producing each of the print products based on the types and statuses of printing apparatuses and pieces of software that available in the printing company. For example, the process designer determines work like adjustment of devices in a post-process apparatus for the print product A and color calibration of a printing apparatus for the print product B, and further determines result checking work in each work, such as colorimetry work after color calibration. In addition, the process designer determines a quality checking method that directs how to check the fact that a produced print product meets quality terms as in the case of, for example, a checking point on a print misregistration between both sides and the maximum value of an allowable amount of misregistration. A plurality of printing apparatuses is generally used in a printing company, and a process designer selects an optimal apparatus to meet the quality terms of a print product received as an order, from among those printing apparatuses. In this way, a printing company defines a workflow for producing a print product that meets quality terms and checking the quality of the produced print product. An operator receives the operation process determined in this way and operates the printing apparatus and software. A checker verifies that the print product meets the quality terms based on the produced print product and the quality verification method. In this way, a printing company spends many working hours for an operation process to meet quality terms and for transferring a quality report indicating the quality of a verified print product.

When a customer and a printing company pass these quality terms and quality report, no unified information format has been defined or used so far. Therefore, a printing company receives quality terms in different information formats from a plurality of customers, resulting in inconvenience at the time of designing an operation process for meeting the quality terms based on those terms. When a customer orders print products to a plurality of printing companies, there has been cumbersome work to pass quality terms and a quality report in different information formats.

As a unified method of information format for transferring quality terms and a quality report, PRX described at ISO/AWI 20616-1, Graphic technology Pile format for quality control and metadata Part 1: Print requirements exchange (PRX) and PQX described at https://www.iso.org/standard/68565.html, ISO/CD 20616-2, Graphic technology File format for quality control and metadata Part 2: Print quality exchange (PQX), and https://www.iso.org/standard/169572.html are taken into consideration. PRX is the abbreviation of Print Requirement eXchange format and stands for a standard data format of quality terms on printing. With PRX, quality terms of different customers or different orders received can be described in a unified standard data format. PQX is the abbreviation of Print Quality eXchange format and stands for a standard data format of print quality reports. PQX allows the quality data of print products to be transferred in a standard data format. In this way, quality terms and quality reports that have not been unified so far can be transferred in a unified information format by using PRX and PQX.

A technology related to workflow construction on orders for print products are described in PTL 1. The technology described in PTL 1 constructs a workflow for making it possible to produce a print product meeting terms of orders received by retrieving processes from a database containing the definitions of individual processes that make up a workflow to meet the specifications of the print product and combining the retrieved processes. At this time, the technology described in PTL 1 allows to provide discount information to a customer by providing workflows for different terms of orders received together with costs to the customer. Thus, the customer is able to select a desired workflow from among the plurality of workflows having different costs by making a comparison between the specifications and the costs.

CITATION LIST

Patent Literature

PTL 1: Japanese Patent Laid-Open No. 2008-009863

SUMMARY OF INVENTION

Technical Problem

Although the information formats for transferring quality terms or quality reports are suggested, how these information formats are applied to a printing system described in PTL 1 has not been taken into consideration so far.

Solution to Problem

An information processing apparatus includes a receiving unit configured to receive order data including quality request data from an order receiving system, an interpretation unit configured to interpret the received quality request data, a generation unit configured to generate a job containing information that is used for quality adjustment to be performed by a production system, based on the quality request data interpreted by the interpretation unit, and a sending unit configured to send the job to the production system. The generation unit is configured to generate the job containing quality request data in a data format that is same as a data format of the quality request data received by the receiving unit.

Further features of the present invention will become apparent from the following description of exemplary embodiments with reference to the attached drawings.

BRIEF DESCRIPTION OF DRAWINGS

FIG. 3 is a block diagram that illustrates the hardware configuration of a workflow management system according to the first embodiment.

FIG. 4 is a block diagram that illustrates the hardware configuration of a production system according to the first embodiment.

FIG. 5A is a block diagram that illustrates the software configuration of an order receiving system server according to the first embodiment.

FIG. 5B is a block diagram that illustrates the software configuration of a workflow management server according to the first embodiment.

FIG. 5C is a block diagram that illustrates the software configuration of the production system according to the first embodiment.

FIG. 6A is a sequence diagram that illustrates software processing according to the first embodiment.

FIG. 7 is a schematic view of PRX.

FIG. 8 is a schematic view of PQX.

FIG. 9 is a block diagram that illustrates the hardware configuration of a production system according to a second embodiment.

FIG. 10A is a sequence diagram that illustrates software processing according to the second embodiment.

DESCRIPTION OF EMBODIMENTS

Figure 1:
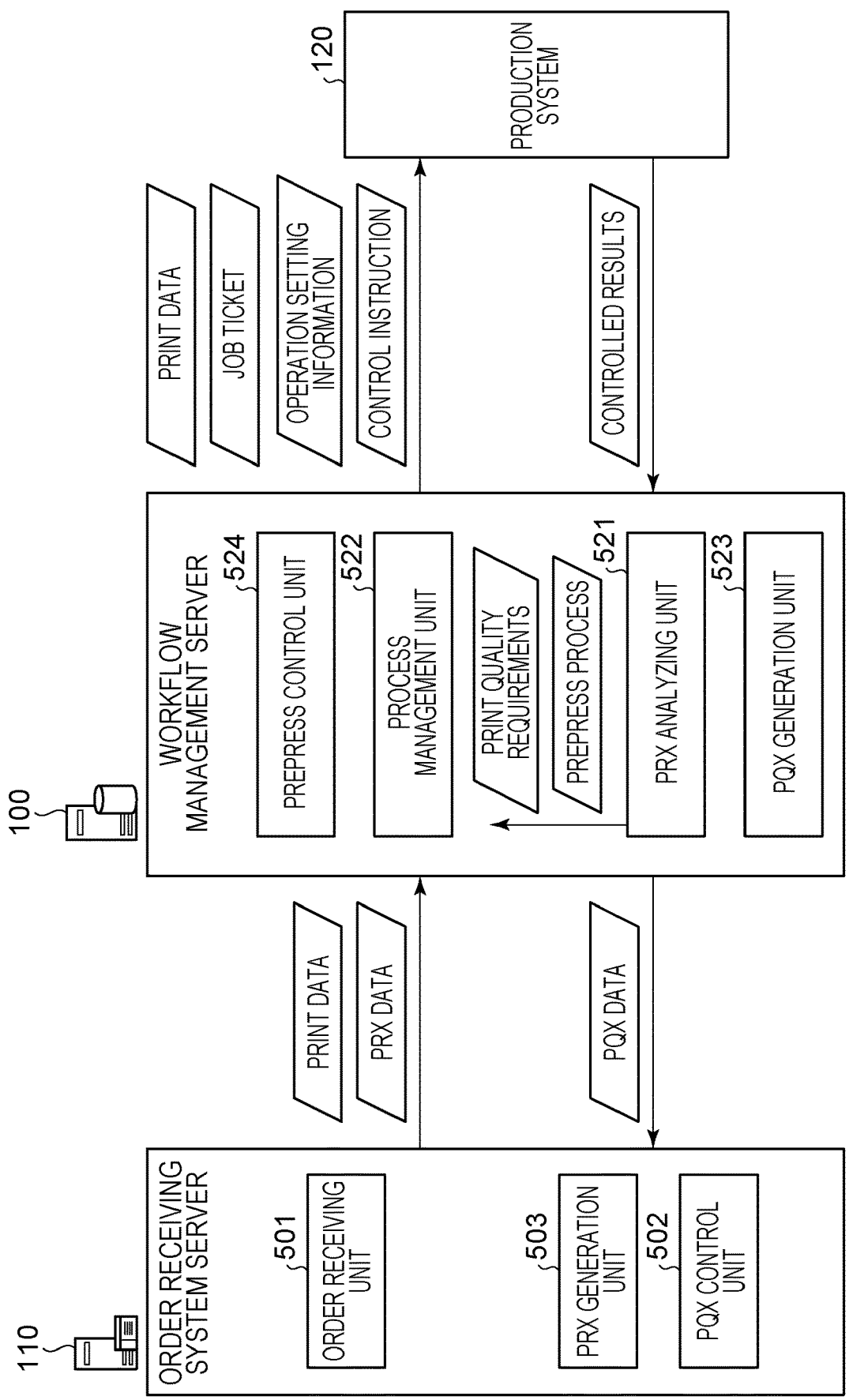
FIG. 1 is an overall schematic diagram according to a first embodiment.

Hereinafter, embodiments of the present invention will be described in detail with reference to the accompanying drawings. The following embodiments do not limit the present invention according to the appended claims, and not all the combinations of characteristics described in the present embodiments are indispensable for the solution of the invention.

First Embodiment

Quality terms, of print products vary among customers or print products, and there can be a wide variety of methods for achieving the quality terms. For example, as quality terms, it is assumed that a customer desires color reproducibility and stability at a high level on a corporate color(s) for use in a logo of a corporation. Color reproducibility is a measure indicating how much a color expressed in a definition, such as ROB and CMYK, in print data provided by a customer is printed in the same color on a print product. Stability is a measure indicating how much print data of the same color is printed in unchanged color on a print product in printing of multiple pages or multiple sets. Since corporate colors represent corporations or organizations, customers often request high color reproducibility and stability, that is, print data is printed in the same color as the print data provided by the customers and results are unchanged on any page, as quality terms. On the other hand, the presence or absence of a printing apparatus to meet quality terms and an operation process depend on print data provided from customers and the specifications of print products. In an example of a corporate color, color values designated by a customer influence a printing apparatus to be used and selection of ink. For color stability as well, color calibration of a printing apparatus and the frequency of checking sample print vary as an operation process depending on a sheet designated in specifications, and a printing apparatus and ink to be used.

In this way, there are various operation processes to meet quality terms requested by customers depending on the specifications of print products and the quality terms requested by the customers. With the above-described PRX format, quality request data for a print product received as an order from a customer can be input every print job received as an order in a digital format. With PQX, a quality report can be written every print job in a digital format. Therefore, a printing system is sought to interpret PRX and adjust a printing apparatus to meet a quality request and allow quality management in each job for generating a sample print job to check whether the quality request is met.

The present embodiment suggests a printing system for creating a print product that meets quality terms requested by a customer and for creating a quality report on the print product. The printing system analyzes quality terms requested by a customer and plans an operation process with a printing apparatus and software in a printing company. The printing system also plans a quality check process for a produced print product. Then, the printing system automatically presets the printing apparatus and the software. Thus, the printing company is provided with the printing system that is able to reduce work man-hours to meet quality terms and further easily determine, transfer, and run an operation process.

In the present embodiment, the above-described PRX and PQX are used as data formats for quality terms and quality reports. By using such standard formats, quality terms and quality reports can be easily transferred among different customers or among different printing companies. Comparisons in quality terms or quality report between different print products are possible.

In the present embodiment, an example in which a workflow management server 100 interprets a print quality request described in PRX format and sets print quality in a production system 120 according to request details will be described. The workflow management server 100 is an information processing apparatus that acquires order data from an order receiving system server 110, interprets the acquired order data, and sets print quality in the production system 120 based on the interpreted results.

FIG. 1 is an overall schematic diagram of the printing system according to the present embodiment. The roles of apparatuses and the detailed operation of the printing system will be described in detail with reference to FIG. 2 and subsequent drawings. In FIG. 1, parallelogram blocks represent data. In the present embodiment, the workflow management server 100 and the production system 120 each include a PRX analyzing unit. With this configuration, not only the workflow management server 100 but also a print control unit 541, an inspection control unit 543, a postprocessing control unit 542. each are capable of analyzing PRX, so appropriate operational control can be performed in the production system 120.

Figure 2:
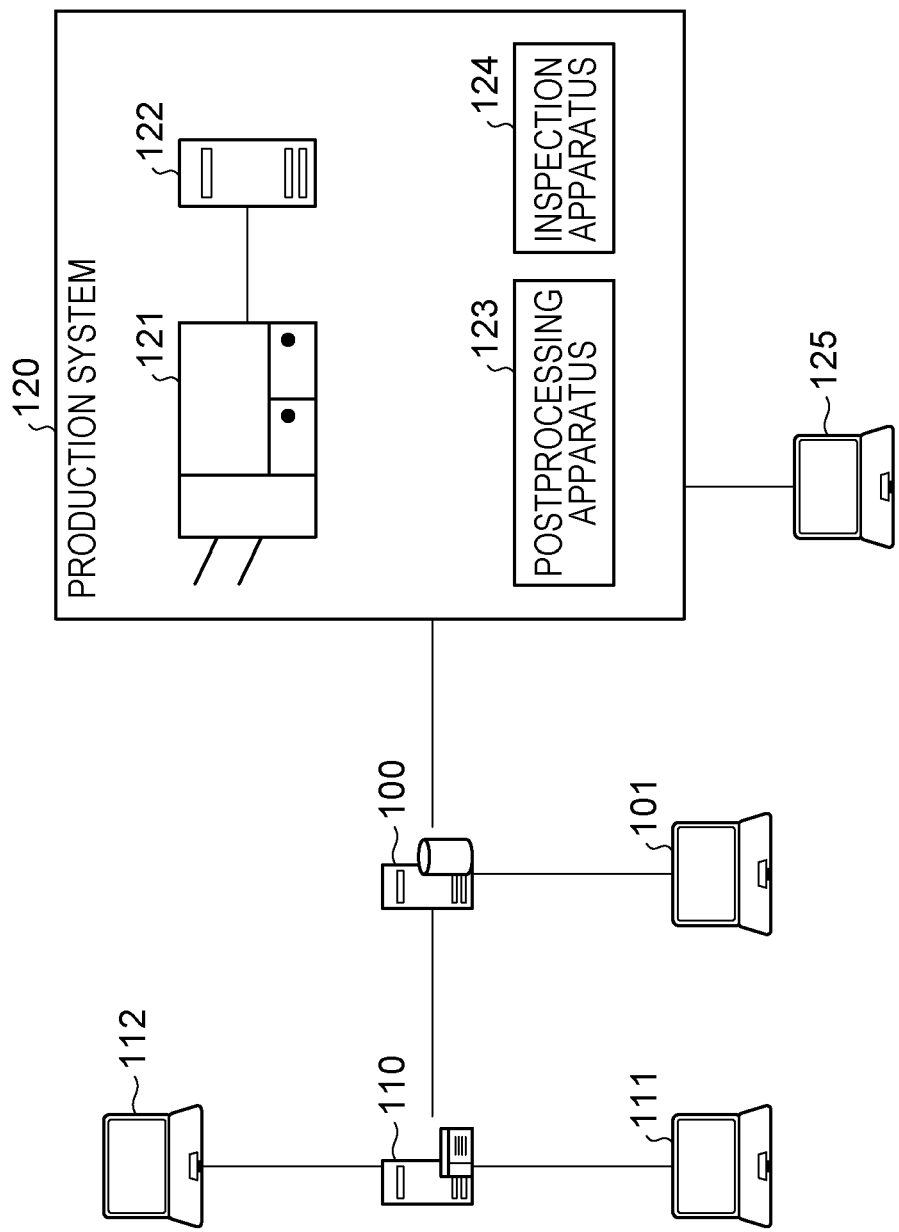
FIG. 2 is a conceptual view that illustrates the overall configuration of a system according to the first embodiment.
Figure 6B:
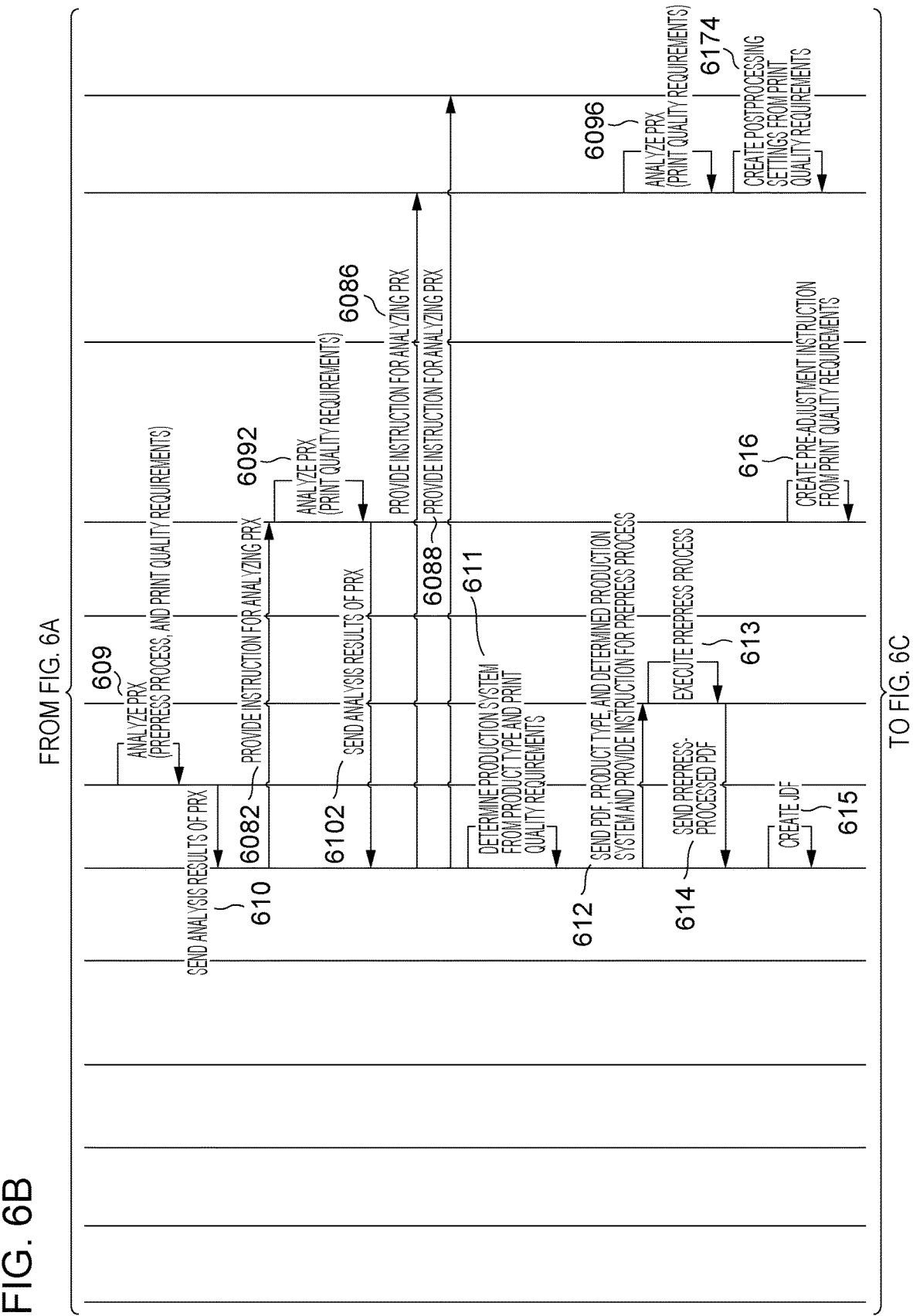
FIG. 6B is a sequence diagram that illustrates software processing according to the first embodiment.
Figure 6C:
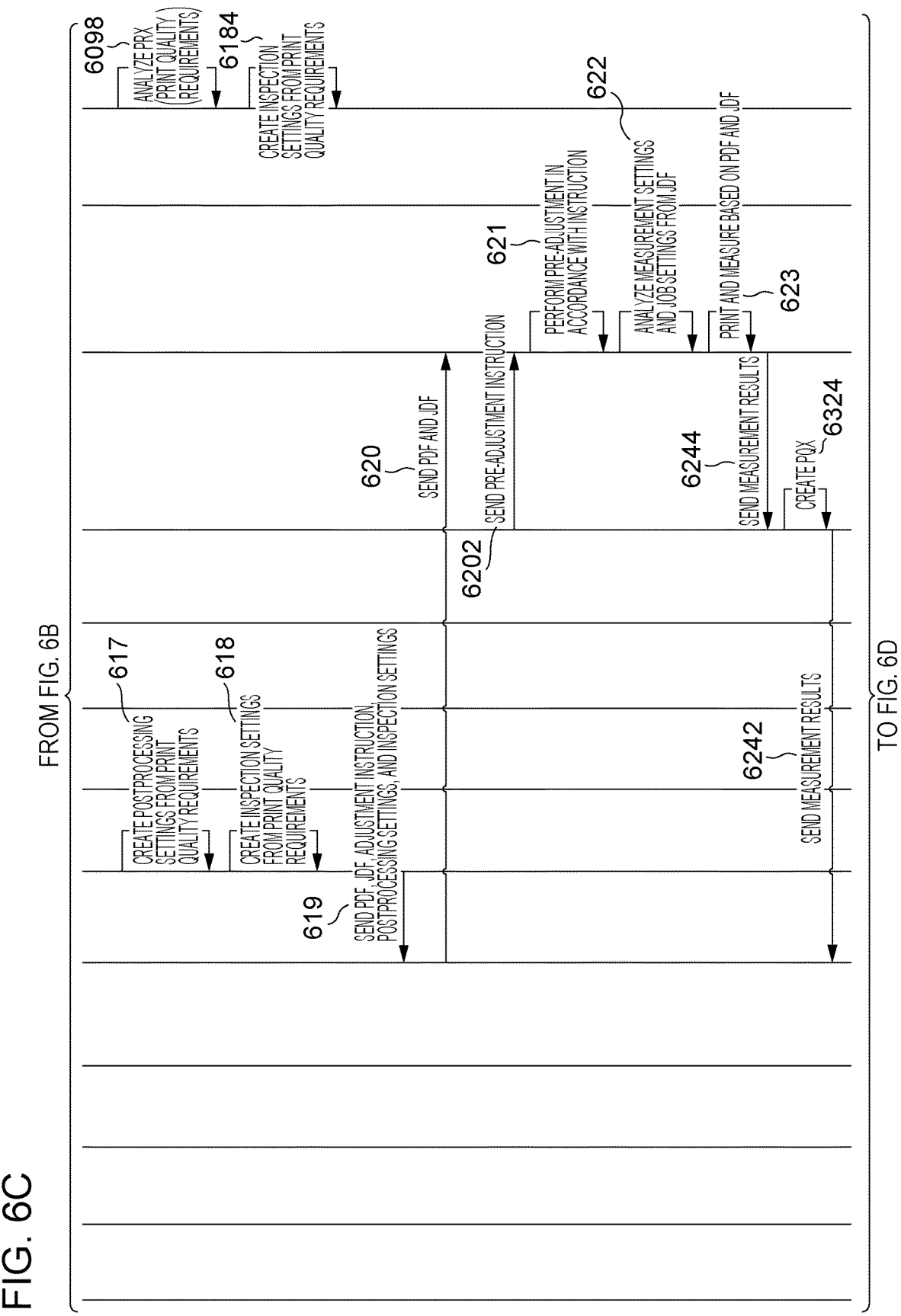
FIG. 6C is a sequence diagram that illustrates software processing according to the first embodiment.
Figure 6D:
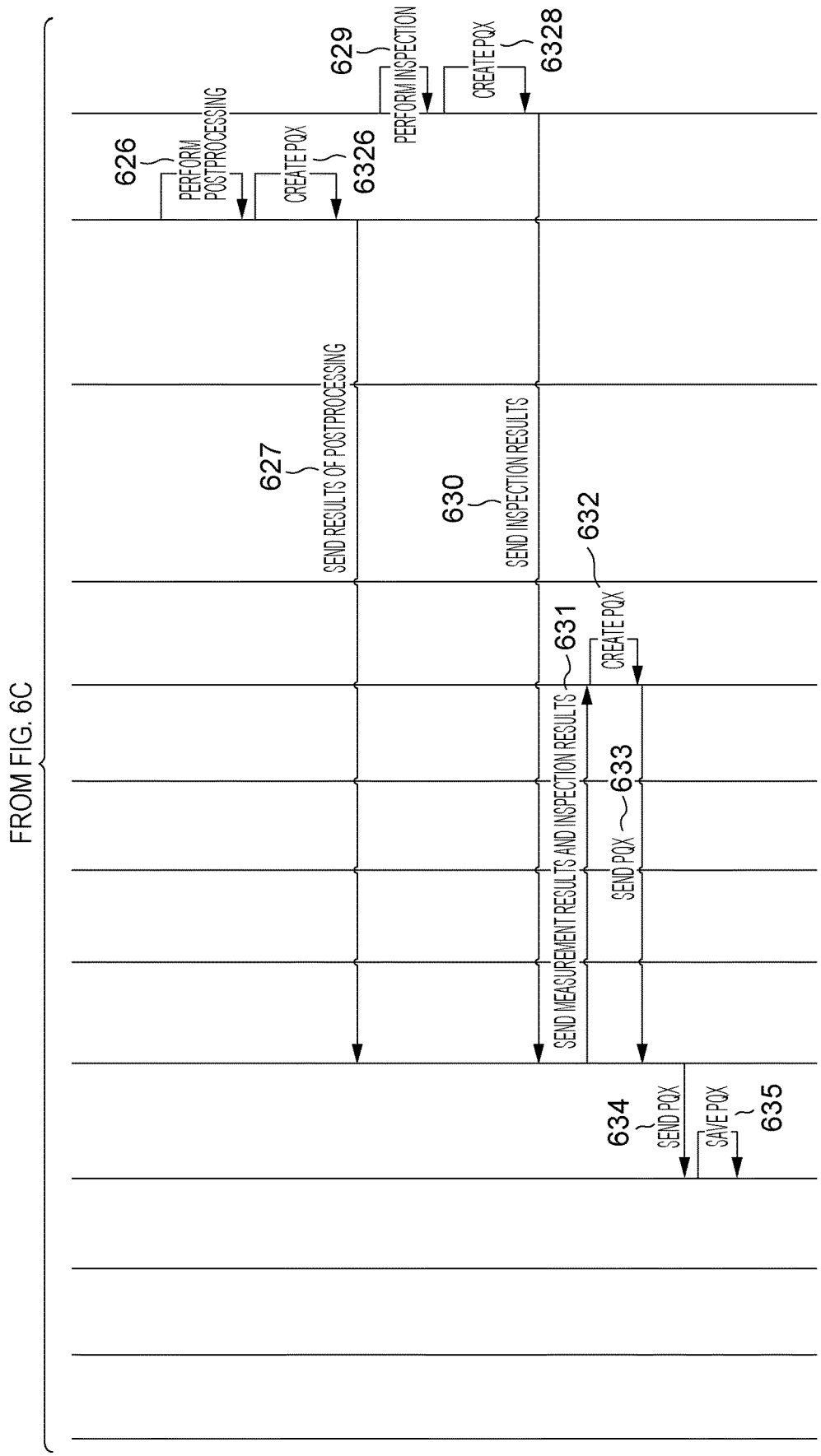
FIG. 6D is a sequence diagram that illustrates software processing according to the first embodiment.
Figure 10B:
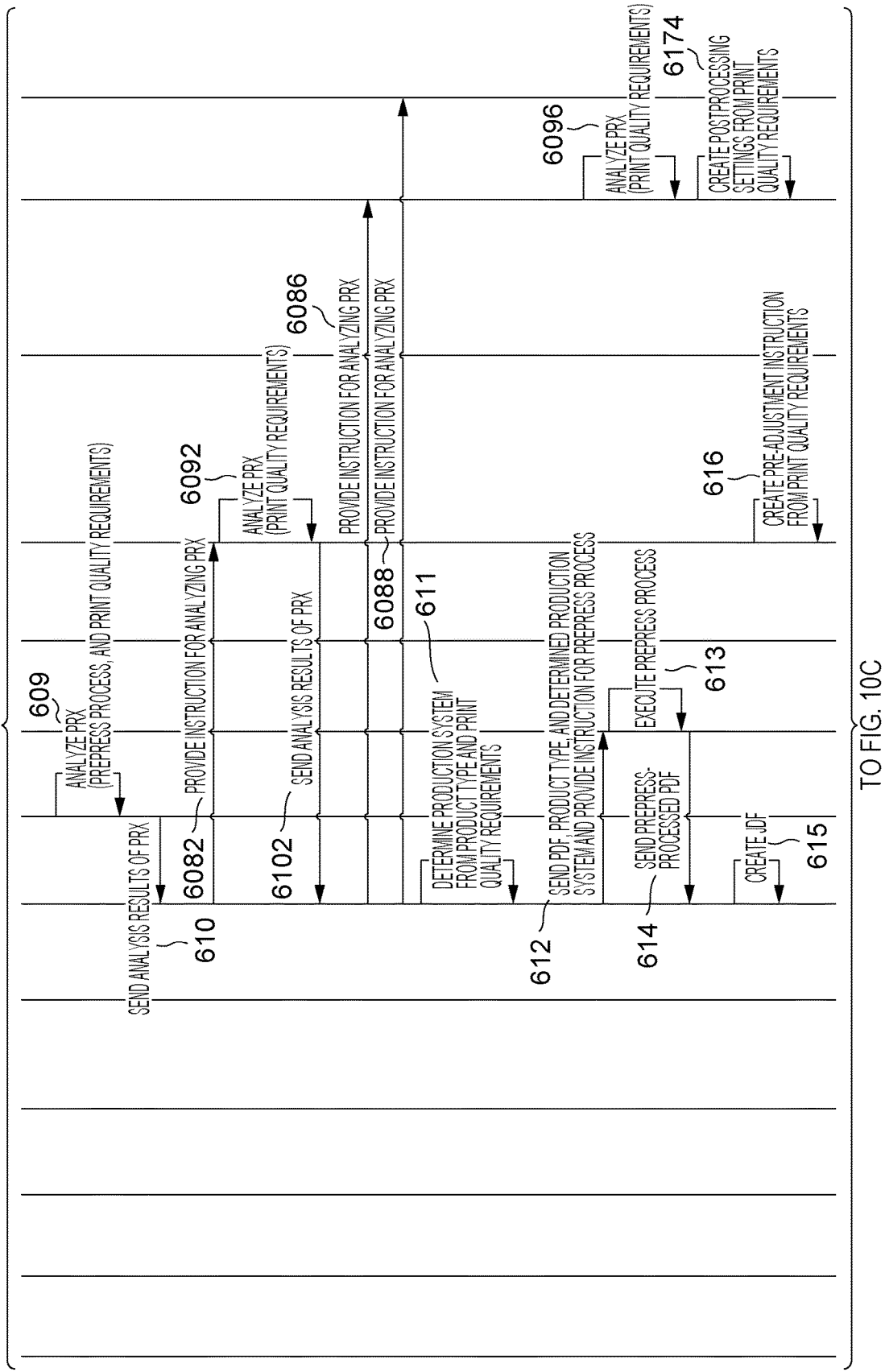
FIG. 10B is a sequence diagram that illustrates software processing according to the second embodiment.
Figure 10C:
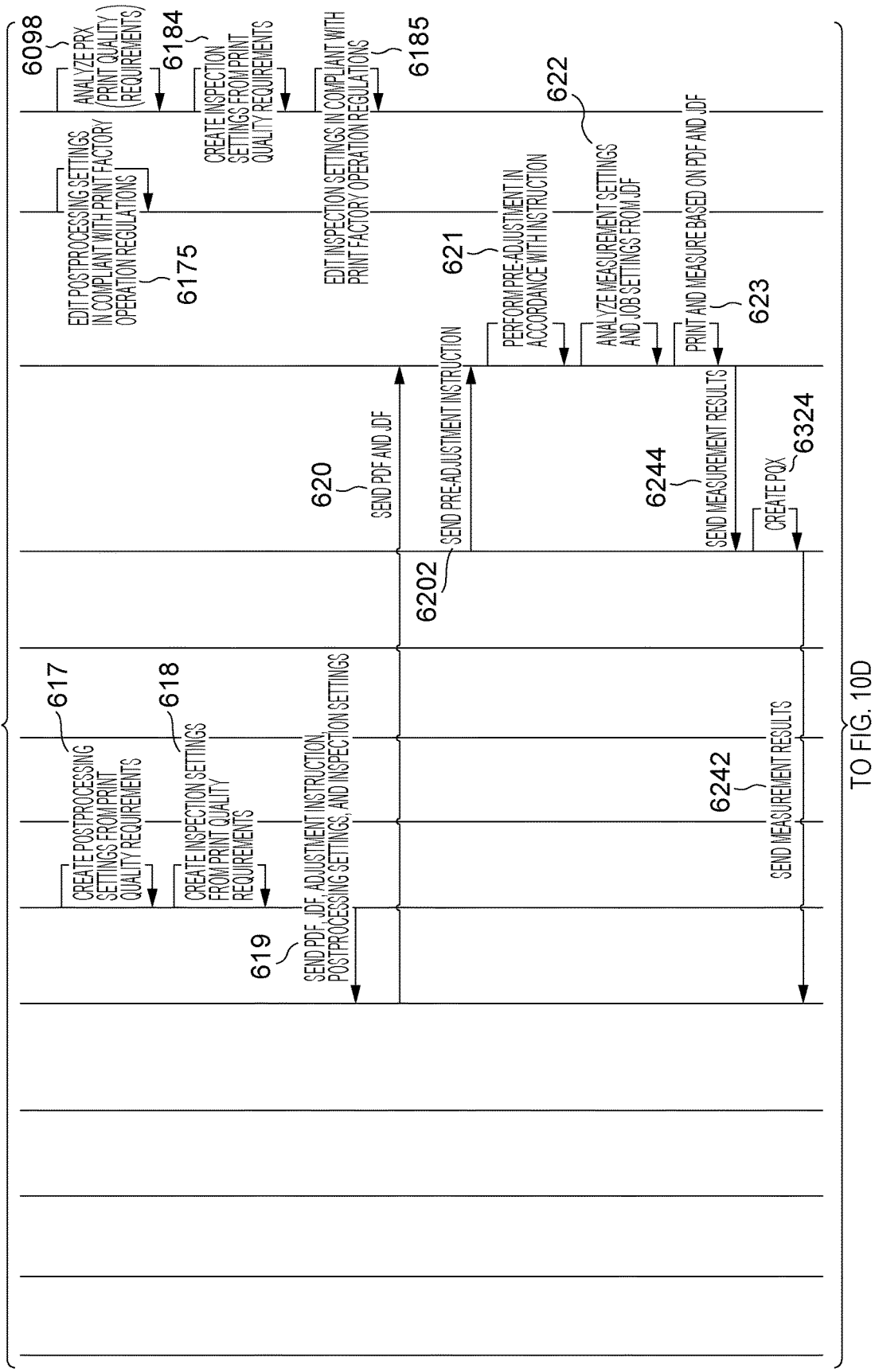
FIG. 10C is a sequence diagram that illustrates software processing according to the second embodiment.
Figure 10D:
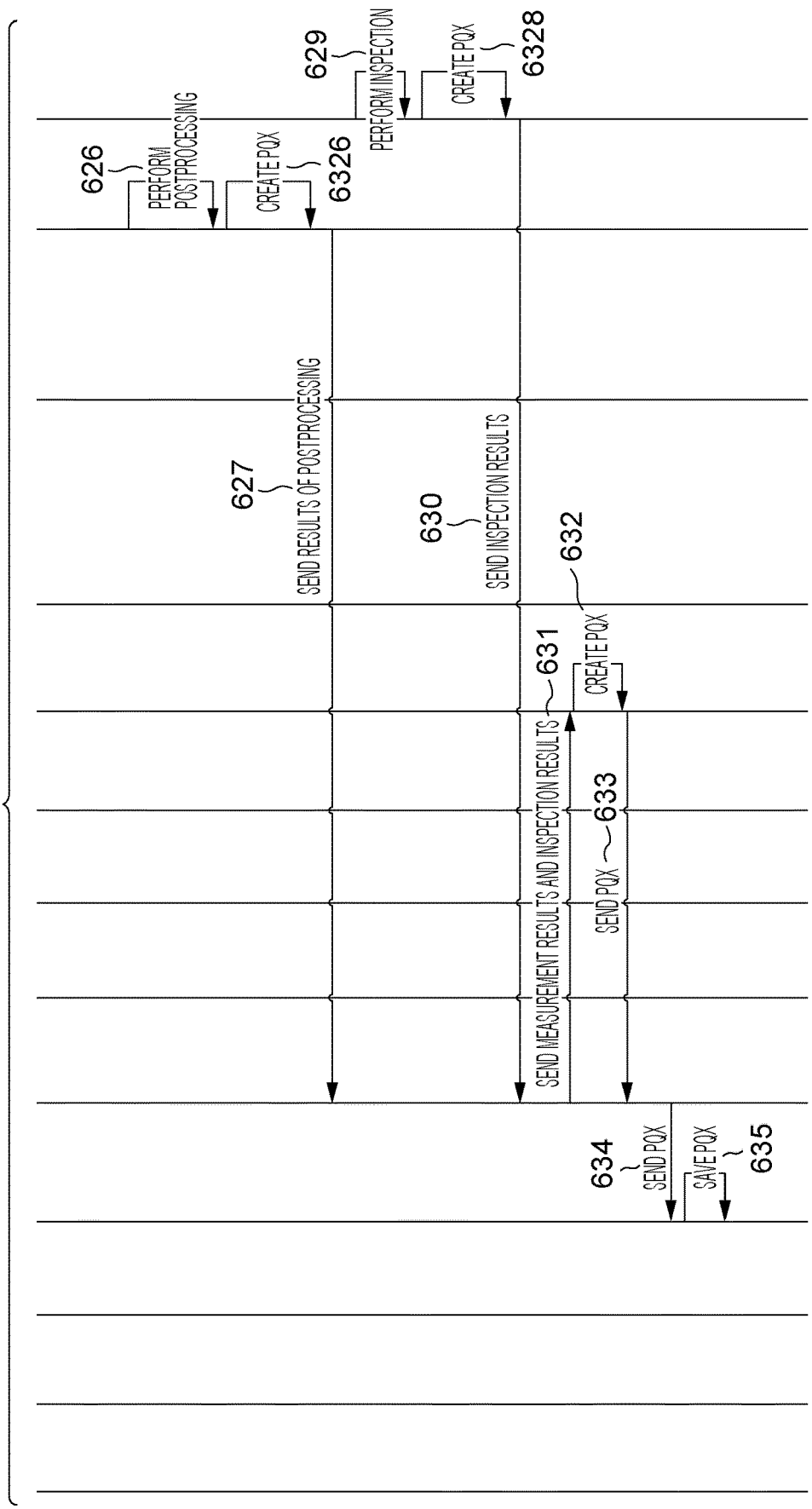
FIG. 10D is a sequence diagram that illustrates software processing according to the second embodiment.

FIG. 2 is a view that illustrates the configuration of a commercial printing system according to the present embodiment. The workflow management server 100 manages the entire workflow related to commercial printing products.

The workflow management server 100 receives order data (PRX data) including print data and information about quality terms from the order receiving system server 110.

The workflow management server 100 interprets the PRX data received from the order receiving system server 110 and determines the production system 120, executes a prepress process on the print data, or performs other operations, for each job received as an order.

The workflow management server 100 generates data (print data, job ticket, operation setting information, and control instruction shown in FIG. 1) to be processed in the production system 120, and sends the generated data to apparatuses that make up the production system 120. The apparatuses that make up the production system 120 will be described later. The workflow management server 100 generates PQX data based on information (controlled results shown in FIG. 1) acquired from the devices and sends the PQX data to the order receiving system server 110.

The workflow management server 100 performs color management of the production system 120. The workflow management server 100 executes, for example, functions such as known color adjustment and color grade checking. The workflow management server 100 acquires information to be used in these color management controls from the production system 120.

The present embodiment will be described on the assumption that the workflow management server 100 is an on-premise server installed at a site where workflow management is performed; however, the workflow management server 100 is not limited thereto. In another embodiment, the workflow management server 100 may be constructed as a cloud server and a workflow management terminal 101 (described later) may be configured to connect to the workflow management server 100 via the Internet. The order receiving system server 110 (described later) may also be constructed similarly.

The workflow management terminal 101 is a terminal that a workflow manager operates. The workflow management terminal 101 connects to the workflow management server 100 via the network and executes various functions. Specifically, the workflow management terminal 101, for example, changes the settings of a workflow management function or checks the statuses of the apparatuses of the production system 120.

The order receiving system server 110 manages a system for receiving orders from end users on commercial printing products. The order receiving system server 110 generates print data and PRX data according to products received as orders or details of orders from end users and sends the print data and the PRX data to the workflow management server 100.

An order receiving system management terminal 111 is a terminal that an order receiving system manager operates. The order receiving system management terminal 111 connects to the order receiving system server 110 via a network and executes various functions. Specifically, the order receiving system management terminal 111 executes functions such as setting request quality product by product, checking the status of each job received as an order, and browsing information about the grade of a product for each job received as an order.

An end user terminal 112 is a terminal that an end user operates. The end user terminal 112 connects to the order receiving system server 110 via a network. The end user terminal 112 receives, from the end user, an instruction, such as selecting a product, sending original data, and ordering, from a UI, such as a web browser, and sends the instruction to the order receiving system server 110.

The production system 120 is a system for producing commercial printing products (print products) ordered from end users. More specifically, the production system 120 is made up of apparatuses such as a printing apparatus 121, a print server 122 that controls the printing apparatus 121, a postprocessing apparatus 123, and an inspection apparatus 124.

The printing apparatus 121 and the print server 122 are connected via a network or a dedicated interface.

Description will be made on the assumption that the postprocessing apparatus 123 and the inspection apparatus 124 each are set in a near-line configuration such that the postprocessing apparatus 123 and the inspection apparatus 124 each are connected to the other devices via a network in the present embodiment. However, the configuration is not limited thereto. The postprocessing apparatus 123 or the inspection apparatus 124 may be set in an offline configuration such that the postprocessing apparatus 123 or the inspection apparatus 124 operates alone. In the case of the offline configuration, the postprocessing apparatus 123 or the inspection apparatus 124 connects to an operating terminal (not shown) connectable to a network and connects to the network via the operating terminal. In any case, the postprocessing apparatus 123 or the inspection apparatus 124 connects to the workflow management server 100 and sends or receives various pieces of information via a network.

The production system 120 can be configured not to include any one or two or all of the print server 122, the postprocessing apparatus 123, and the inspection apparatus 124.

The printing apparatus 121 executes a printing process based on an instruction and data from the workflow management server 100. A printing method is not limited and may be any method, such as an electrophotographic method, an inkjet method, and other methods.

A manager or operator of the production system 120 is able to provide an instruction for control on printing via a UI of the printing apparatus 121.

The printing apparatus 121 interprets PRX received from the workflow management server 100 and reflects the PRX in various controls. The printing apparatus 121 generates PQX from results obtained through the various controls and sends the PQX to the workflow management server 100. Details will be described later.

The print server 122 controls the printing apparatus 121. As in the case of a general printing system, the manager or operator of the production system 120 is able to provide an instruction for control on printing via a UI of the print server 122. The print server 122 interprets PRX received from the workflow management server 100 and reflects the PRX in various controls. Details will be described later.

In the present embodiment, description will be made on the assumption that the print server 122 includes a color management unit 545 (described later); however, the configuration is not limited thereto. For example, a color management server (not shown) that is connectable to the print server 122 and the printing apparatus 121 via a network may be installed as a separate device and executes a process on color management.

The postprocessing apparatus 123 is an apparatus for applying postprocessing to printed sheets or batches of sheets. For example, the postprocessing apparatus 123 creases or folds sheets or cuts or binds batches of sheets. The postprocessing apparatus 123 interprets PRX received from the workflow management server 100 and reflects the PRX in various controls. The postprocessing apparatus 123 generates PQX from results obtained through the various controls and sends the PQX to the workflow management server 100. Details will be described later.

The inspection apparatus 124 executes a process of detecting a product that does not meet a quality request from among final products or interim products and executes processes such as notifying a user and excluding such a product from a production line. The inspection apparatus 124 interprets PRX received from the workflow management server 100 and reflects the PRX in various controls. The inspection apparatus 124 generates PQX from results obtained through the various controls and sends the PQX to the workflow management server 100. Details will be described later.

A production operator terminal 125 is a terminal that a production system manager operates. The production operator terminal 125 is able to connect to the production system 120 via a network and monitor or manage the status of the production system 120.

Next, the hardware configuration of the various apparatuses according to the present embodiment will be described. FIG. 3 is a block diagram that illustrates the hardware configuration of a workflow management system including the workflow management server 100 and the workflow management terminal 101 according to the present embodiment.

First, the hardware configuration of the workflow management server 100 will be described.

A CPU 201 loads a control program stored in a ROM 202 or a hard disk drive (HDD) 204 into a RAM 203 and runs the loaded program, thus generally controlling access to various devices connected to a system bus 206. The ROM 202 stores the control program, and the like, that the CPU 201 is able to run. The RAM 203 mainly functions as a main memory, work area, or the like, for the CPU 201 and is configured so that a memory capacity can be increased by using an optional RAM 203 that is connected to an expansion port (not shown). The hard disk drive (HDD) 204 stores a boot program, various applications, font data, user files, edit files, and the like. In the first embodiment, the HDD 204 is used. Alternatively, an SD card, a flash memory, or the like, except the HDD 204 may be used as an external storage. This also applies to apparatuses including an HDD, which will be described hereinafter. A network I/F 205 performs data communication with various apparatuses via a network.

The hardware configuration of the order receiving system server 110 is similar to that of the workflow management server 100, so the description thereof is omitted.

First, the hardware configuration of the workflow management server 100 will be described. A CPU 201 loads a control program stored in a ROM 202 or a hard disk drive (HDD) 204 into a RAM 203 and runs the loaded program, thus generally controlling access to various devices connected to a system bus 206. The ROM 202 stores the control program, and the like, that the CPU 201 is able to run. The RAM 203 mainly functions as a main memory, work area, or the like, for the CPU 201 and is configured so that a memory capacity can be increased by using an optional RAM 203 that is connected to an expansion port (not shown). The hard disk drive (HDD) 204 stores a boot program, various applications, font data, user files, edit files, and the like. In the first embodiment, the HDD 204 is used.

Alternatively, an SD card, a flash memory, or the like, except the HDD 204 may be used as an external storage. This also applies to apparatuses including an HDD, which will be described hereinafter. A network I/F 205 performs data communication with various apparatuses via a network.

The hardware configuration of the order receiving system server 110 is similar to that of the workflow management server 100, so the description thereof is omitted.

The hardware configurations of the order receiving system management terminal 111, end user terminal 112, and other terminal apparatuses such as a production operator terminal are similar to that of the workflow management terminal 101, so the description thereof is omitted.

FIG. 4 is a block diagram that illustrates the hardware configuration of the production system 120 according to the present embodiment.

A CPU 301 loads a control program stored in a ROM 302 or a hard disk drive (HDD) 304 into a RAM 303 and runs the loaded program, thus generally controlling access to various devices connected to a system bus 306. The ROM 302 stores the control program, and the like, that the CPU 301 is able to run. The RAM 303 mainly functions as a main memory, work area, or the like, for the CPU 301 and is configured so that a memory capacity can be increased by using an optional RAM that is connected to an expansion port (not shown). The hard disk drive (HDD) 304 stores a boot program, various applications, font data, user files, edit files, and the like. A network I/F 305 performs data communication with other apparatuses via a network.

A printer I/F 307 controls image output to an image forming part 321 of the printing apparatus 121. The printer UP 307 controls a measuring part 322 included in the printing apparatus 121 and receives measurement results.

The printing apparatus 121 includes at least the image forming part 321 that is in charge of printing operation, and the measuring part 322 (described later). In addition, a sheet feeder (not shown) or an in-line post-processing apparatus may be further connected.

The image forming part 321 outputs print data to a sheet. The hardware configuration of the printing apparatus 121 is the same as a general printing apparatus.

The measuring part 322 measures printed matter that the image forming part 321 generates in accordance with an instruction from the print server 122 or the printing apparatus 121 itself. A measurement method is a known measurement method, such as a spectrocolorimetry, densitometry, CCS scan, and CIS scan.

In the present embodiment, description will be made on the assumption that the measuring part 322 is provided in the printing apparatus 121; however, the configuration is not limited thereto.

The measuring part 322 alone may be independent of the printing apparatus 121 and configured to connect to a network. Alternatively, the measuring part 322 may be configured to connect to an operating terminal (not shown) connectable to a network and connect to a network via the operating terminal. In any case, the measuring part 322 connects to the workflow management server 100 and sends or receives various nieces of information via a network.

Next, the software configuration of the various apparatuses according to the present embodiment will be described.

FIG. 5A is a block diagram that illustrates the software configuration of the order receiving system server 110 according to the present embodiment. These software modules are stored as programs in an HDD (not shown) and are implemented when a CPU (not shown) loads the programs into a RAM (not shown) and runs the programs.

An order receiving unit 501 receives product order information from the end user terminal 112 via a network. Order information contains information about a product type, submitted image data, request information on quality, and the like. In the present embodiment, PDF format data will be described as submitted data as an example; however, a data format is not limited thereto. Image data in other general formats that the production system 120 is capable of interpreting may be employed.

A PQX control unit 502 receives PQX data from the workflow management server 100 and executes predetermined control. For example, the PQX control unit 502 records the PQX data in a database or converts the PQX data to information to be provided to an end user.

A PRX generation unit 503 analyzes the order information received from the order receiving unit 501 and generates PRX data. The PRX generation unit 503 sends the generated PRX data to the workflow management server 100.

A data management unit 504 records information such as order information, PRX data, and PQX data. The data management unit 504 sends the submitted image data, product type information, and PRX data to the workflow management server 100. The data management unit 504 sends or receives other data to or from various apparatuses.

FIG. 5B is a block diagram that illustrates the software configuration of the workflow management server 100 according to the present embodiment. These software modules are stored as programs in the HDD 204 and are implemented when the CPU 201 loads the programs into the RAM 203 and runs the programs.

A PRX analyzing unit 521 analyzes PRX data received from the order receiving system server 110 and identifies print quality requirements and part of a set prepress process. For example, print quality requirements mean that an average color difference that is obtained from measurement results of a predetermined color patch falls within a specific criterion. A prepress process includes, for example, processes, such as adding a color patch image to a margin of image data. A color patch image is subjected to colorimetry in a color grade checking process.

A process management unit 522 determines the production system 120 or provides a command to the prepress control unit 524 by using the product type information received from the order receiving system server 110 and the analysis result information of the PRX analyzing unit 521. Depending on a product type, a product may be made up of multiple types of parts. In this case, the process management unit 522 generates a job on a part basis from one order.

The process management unit 522 generates job ticket data that the apparatuses in the production system 120 make reference to. In the present embodiment, description will be made by using known JDF data as job ticket data; however, the configuration is not limited thereto. Other known job ticket data formats that can be interpreted by the production system 120 may be used. The process management unit 522 identifies processes set for the color management unit 526 from the print quality requirements and sends a control instruction to the color management unit 526.

The process management unit 522 sends prepress-processed PDF data (described later), the JDF data, and the operation setting information of the apparatuses to the production system 120.

A PQX generation unit 523 makes reference to various pieces of information received from the production system 120, generates PQX data, and sends the PQX data to the order receiving system server 110. Details will be described later.

The prepress control unit 524 executes a prepress process on submitted image data based on an instruction from the process management unit 522 and sends the processed PDF data to the process management unit 522.

A data management unit 525 sends PQX data to the order receiving system server 110. The data management unit 525 sends the PDF data and the MP data to the production system 120 and instruction information for various apparatuses that make up the production system 120. The data management unit 525 sends or receives other data to or from various apparatuses.

The color management unit 526 manages color quality of products output by the printing apparatus 121 and the print server 122. Specifically, the color management unit 526 controls a known color adjustment process or color grade checking process. To execute the color adjustment process or the color grade checking process, printing of dedicated patch image data and a measurement process are performed. Therefore, the color management unit 526 acquires ability information of the measuring part 322 of the printing apparatus 121. Ability information is, for example, a measurable data format, a measurable sample number per unit output, or the like.

The color management unit 526 generates patch image data by using these data. For example, the color management unit 526 instructs the prepress control unit 524 to add measurement patch image data to the margin of PDF data received as an order. Alternatively, the color management unit 526 sends signal value information of a measurement patch to the print server 122 or the printing apparatus 121 and sends an instruction to the print server 122 or the printing apparatus 121 to generate patch image data in the production system 120. After the color management unit 526 issues an instruction to the production system 120 to print and measure patch image data, the color management unit 526 receives measurement results as needed and uses the measurement results in, for example, the color grade checking process.

FIG. 5C is a block diagram that illustrates the software configuration of the production system 120 according to the present embodiment. These software modules are stored as programs in the HDD 304 in various apparatuses that make up the production system 120 and are implemented when the CPU 301 loads the programs into the RAM 303 and runs the programs. The production system 120 includes the printing apparatus 121, the print server 122, the postprocessing apparatus 123, and the inspection apparatus 124; however, in the present embodiment, description will be made on the assumption that these four hardware components make up the production system 120.

The print control unit 541 executes print control by using information (PDF, JDF) received from the workflow management server 100. The print control unit 541 also has an adjustment function to adjust a print grade, and executes the adjustment function in accordance with a control instruction received from any one of the workflow management server 100, the print server 122, and the operator terminal.

The print control unit 541 includes a measurement control unit 5411. The measurement control unit 5411 executes measurement control by using the measuring part 322 in accordance with a control instruction received from any one of the workflow management server 100, the print server 122, and the operator terminal.

The print control unit 541 further includes a PRX analyzing unit (printing) 5412. The PRX analyzing unit (printing) 5412 analyzes PQX data received from the workflow management server 100 and provides an instruction for print control, measurement control, or device settings of the printing apparatus 121 and measuring part 322 to meet quality terms.

The postprocessing control unit 542 executes postprocessing control in accordance with a control instruction received from the workflow management server 100. The postprocessing control unit 542 includes a PRX analyzing unit (postprocessing) 5421. The PRX analyzing unit (postprocessing) 5421 analyzes PQX data received from the workflow management server 100 and provides an instruction for postprocessing control or device settings of the postprocessing apparatus 123 to meet quality terms.

The inspection control unit 543 executes inspection control by using the inspection apparatus 124 in accordance with a control instruction received from the workflow management server 100.

The inspection control unit 543 compares image data read by a sensor in the inspection apparatus 124 with reference image data. As a result of comparison, when a difference that exceeds a predetermined allowable range is detected, the inspection control unit 543 identifies the product as an object to be inspected that does not meet the quality request, and executes predetermined control such as notifying a user.

The inspection control unit 543 includes a PRX analyzing unit (inspection) 5431. The PRX analyzing unit (inspection) 5431 analyzes PQX data received from the workflow management server 100 and provides an instruction for inspection control or device settings of the inspection apparatus 124 to meet quality terms.

The data management unit 544 sends information about controlled results, and the like, of various apparatuses of the production system 120 to the workflow management server 100. The data management unit 544 sends or receives other data to or from various apparatuses. The data management unit 544 may be individually included in each apparatus.

FIG. 6A to FIG. 6D are a set of sequence diagrams that illustrate software processing according to the first embodiment.

In 601, the order receiving unit 501 receives an order from an end user. Details of the order contain PDF as print data and a product type on a print product. A product type is information indicating the type of a print product that the order receiving system server 110 defines in advance. For example, it is assumed that the order receiving system server 110 defines two product types, that is, "photo book" and "business card". The product type "photo book" indicates the type of a print product having a trim size "A5", a binding type "adhesive binding", contents paper type "glossy paper", and contents finishing "laminating". The product type "business card" indicates the type of a print product having a trim size "business card", a binding type "none", and a paper type "premium paper". By providing such product types, the types of product to be produced are defined in the order receiving system server 110, the workflow management server 100, or the production system 120. In the present embodiment, description will be made on the assumption that the end user selects "photo book". In the present embodiment, description will be made on the assumption that the order receiving system server 110 defines product types; however, the configuration is not limited thereto. A sales representative may manually input an order from an end user.

In 602, the order receiving unit 501 sends the product type received as an order from the end user in 601 to the PRX generation unit 503. When the end user selects "photo book" from among the product types, the order receiving unit 501 sends the fact that the end user's choice is "photo book" to the PRX generation unit 503.

In 603, the PRX generation unit 503 generates PRX from the product type received from the order receiving unit 501 in 602. First, the outline of PRX to be generated in this process will be described.

As illustrated in FIG. 7, PRX is composed of requests for quality, such as MessageInfo, BusinessInfo, and QualitySpec. QualitySpec is composed of fields including quality specifications and evaluation criteria. BasisOfCalculation indicates information on a calculation formula designated by a buyer for designating the score and grade of print quality. Here, a buyer is, for example, an end user or an intermediary who inputs information to the system by determining an end user's demand. BasisOfCalculation may be automatically set by the order receiving system server 110 based on information input by a buyer. OverallGradingScale indicates the meaning and range of the overall score and grade. MinimumAcceptableRank indicates an allowable minimum quality level, QualityParameterSet indicates a score criterion, or the like, for each of color, registration, image defect, and bar code. QualityParameterSetType indicates the type of quality specifications such as color, registration, image defect, and bar code. ParameterSetName indicates the names of quality specifications. ParameterSetScoringScale indicates the score criterion definition of a buyer.

A color quality request is, for example, a request to designate an allowable range of a color difference that is a difference in color value between a reference color value and an actual print result. A color difference can be identified by, for example, measuring a result obtained by printing a predetermined patch corresponding to a reference value of Japan Color, or the like, and comparing the reference value with the measurement result. As described above, when a color quality request is designated, "Color" is described in QualityParameterSetType in PRX. In addition, a quality rank or a degree of color difference commensurate with a quality rank is described in ParameterSetScoringScale.

A registration quality request is a request to designate an allowable range of misregistration of an image to be drawn relative to a sheet. For example, a misregistration of an image to be drawn includes a misregistration between an image drawn on the surface of a sheet and an image drawn on the back surface of the sheet, and the like. Alternatively, a misregistration of an image drawn on one side includes a misregistration from a reference in relative relationship between a drawn image and a reference position on a sheet, a misregistration in drawn position for each color plate, and the like. When the registration quality request is designated, "Registration" is described in QualityParameterSetType in PRX. In addition, a quality rank or a degree of misregistration commensurate with a quality rank is described in ParameterSetScoringScale.

A bar code quality request, for example, indicates a print quality or print type of a bar code to be printed on a print product. Print quality of a bar code, for example, indicates the degree of easiness a bar code is read. For example, it is presumable that a change in gray level step that occurs in gray level correction influences quality of reading a bar code and, as a result, a bar code read error occurs. Therefore, by defining the quality of a bar code, the details of gray level correction can be controlled.

In the present embodiment, description will be made on the assumption that part of QualitySpec is used; however, the configuration is not limited thereto. Another field of PRX may be used. As an example of first QualityParameterSet, there is a color variation test that is performed by the print control unit 541.

The print control unit 541 includes the measurement control unit 5411, and is capable of monitoring color variations in the production system 120 during production. There is Japan Color as an example of a print color standard. The production system 120 that meets the standard can be proved that the quality of printed matter is higher than or equal to a certain level. In the present embodiment, a color variation test is performed by checking whether the standard of Japan Color is met for each job.

A color variation is tested based on an average value of color differences ΔE00 (CIE DE2000) between a measured value of printed matter produced by the production system 120 and a prescribed value of Japan Color. In this case, "color variation test" is described in ParameterSetName. "Color" is described in QualityParameterSetType. The following is described in ParameterSetScoringScale: "DisplayLabe: RankColor1, Rank: 1, ValueRange: an average of ΔE00 is greater than or equal to 4"; "DisplayLabe: RankColor2, Rank: 2, ValueRange: an average of ΔE00 is less than 4 and greater than or equal to 3"; and "DisplayLabe: RankColor3, Rank: 3, ValueRange: an average of ΔE00 is less than 3". In the present embodiment, a higher numeric value of Rank indicates higher quality. When "Rank: 2" is set in MinimumAcceptableRank in the QualityParameterSet, the minimum quality level can be described.

As an example of second QualityParameterSet, there is a visual test for toner scattering by the inspection apparatus. Before the production system 120 starts production, a correct image is acquired by a camera attached to the inspection apparatus, and is registered in the inspection apparatus. During production, the inspection apparatus acquires a print result image with the camera and compares the print result image with the correct image, thus testing toner scattering. In this case, "scattering test" is described in ParameterSetName. "Defects" is described in QualityParameterSetType. The following is described in ParameterSetScoringScale: "DisplayLabe: RankDefects1, Rank: 1, ValueRange: Scattering diameter is greater than or equal to 3 mm"; "DisplayLabe: RankDefects2, Rank: 2, ValueRange: Scattering diameter is less than 3 mm and greater titan or equal to 2 mm"; and "DisplayLabe: RankDefects3, Rank: 3, ValueRange: Scattering diameter is less than 2 mm". A higher numeric value of Rank indicates higher quality. When "Rank:2" is set in MinimumAcceptableRank in the QualityParameterSet, the minimum quality level can be described.

By using the above-described QualityParameterSet, the rank of quality is calculated with BasisOfCalculation. For example, a calculation formula for overall quality based on Rank of the color variation test and Rank of the scattering test is described in BasisOfCalculation. For example, a calculation formula like "TotalRank=Rank(color variation test)*0.6+Rank(scattering test)*0.3" is described in BasisOfCalculation.

It is assumed that TotalRank indicates overall quality and Rank(ParameterSetName) indicates Rank associated with ParameterSetName. The meaning of the rank of quality calculated by using the above-described BasisOfCalculation is described by OverallGradingScale. The description is like "DisplayLabe: Poor, Rank: 1", "DisplayLabe: Good, Rank: 2", or "DisplayLabe: Excellent, Rank: 3". Description will be made on the assumption that the PRX generation unit 503 holds PRX that describes quality criteria described up to here as fixed criterion values.

The PRX generation unit 503 determines MessageInfo, BusinessInfo, QualitySpec from the product type received in 602 and generates PRX. In the present embodiment, the PRX generation unit 503 determines MinimumAcceptableRank based on the product type, MinimumAcceptableRank in QualitySpec is indicated lay the rank of quality defined by OverallGradingScale. For example, in the case of the product type "photo book", MinimumAcceptableRank is determined as "Good". MinimumAcceptableRank in QualityParameterSet is also determined based on the product type. MinimumAcceptableRank for ParameterSetName "color variation test" is described like "RankColor3". MinimumAcceptableRank for ParameterSetName "scattering test" is described like "RankDefects2". Thus, when modules receive PRX, the modules are able to interpret a print quality request, so the modules are able to execute processes appropriate for the quality request.

In 604, the PRX generation unit 503 sends the PRX generated in 603 to the data management unit 504.

In 605, the order receiving unit 501 sends the product type and the PDF received from the end user in 601 to the data management unit 504.

In 606, the data management unit 504 of the order receiving system server 110 sends the PDF and product type received as an order from the end user and the PRX generated by the PRX generation unit 503 to the data management unit 525 of the workflow management server 100.

In 607, the data management unit 525 of the workflow management server 100 sends the PDF, product type, and PRX received from the data management unit 504 of the order receiving system server 110 to the process management unit 522.

In 608, the process management unit 522 instructs the PRX analyzing unit 521 to analyze the PRX. At this time, the process management unit 522 sends the PRX received in 607 to the PRX analyzing unit 521.

In 6082, the process management unit 522 instructs the color management unit 526 to analyze the PRX. At this time, the process management unit 522 sends the PRX received in 607 to the color management unit 526.

In 609, the PRX analyzing unit 521 determines the details of prepress process and print quality requirements based on the PRX received from the process management unit 522.

In 6092, the color management unit 526 determines the details of print quality requirements based on the PRX received from the process management unit 522.

In 6102, the color management unit 526 sends the print quality requirements that are the results analyzed from the PRX in 6092 to the process management unit 522.

In 6086, the process management unit 522 instructs the postprocessing control unit 542 to analyze the PRX. At this time, the process management unit 522 sends the PRX received in 607 to the postprocessing control unit 542.

In 6096, the postprocessing control unit 542 determines the details of the print quality requirements based on the PRX received from the process management unit 522.

In 6174, the postprocessing control unit 542 creates postprocessing settings based on the print quality requirements determined in 6096. For example, in the case of photo book, adhesive binding is instructed as a binding method, and laminating is instructed as contents finishing.

These postprocessing settings indicate the type of a post-process that is executed in a post-process control unit of the production system 120 For example, in the case of photo book, an instruction for adhesive binding as a binding method and laminating as contents finishing is created.

In 6088, the process management unit 522 instructs the inspection control unit 543 to analyze the PRX. At this time, the process management unit 522 sends the PRX received in 607 to the inspection control unit 543.

In 6098, the inspection control unit 543 determines the details of the print quality requirements based on the PRX received from the process management unit 522.

In 6184, the inspection control unit 543 creates inspection settings based on the print quality requirements determined in 6098.

These inspection settings indicate the type and criteria of inspection that is performed by the inspection control unit 543 of the production system 120 in the case of the present embodiment, the print quality requirements "The inspection apparatus performs a scattering width test. The minimum quality criterion is a scattering diameter of less than 3 mm and greater than or equal to 2 mm." analyzed by the PRX analyzing unit 521 in 609 are created as inspection settings. However, inspection quality criteria are not limited to scattering and may include other quality criteria, such as maximum density, print misregistration, and the accuracy of finishing.

The PRX is analyzed by each of the PRX analyzing unit 521 and the color management unit 526 in the workflow management server 100 and the postprocessing control unit 542 and the inspection control unit 543 in the production system 120. These units analyze only processable parts in their own functional units and delegate. processes in other functional units to the other functional units. Thus, the functional units determine processes in their own functional units and are able to make up a decentralized cooperative system.

In the case of the present embodiment, it is determined which module runs processes on QualitySpec based on QualityParameterSetType. When QualityParameterSetType is "Color", the measurement control unit 5411 runs processes on QualitySpec. When QualityParameterSetType is "Defects", the inspection control unit 543 runs processes on QualitySpec. In 609, the following is analyzed: "Color variation test" in ParameterSetName described in PRX; "Color" in QualityParameterSetType; and "RankColor3" in MinimumAcceptableRank. The print control unit 541 performs a test on $\Delta E00$. The print quality requirements that the minimum quality criterion is $\Delta E00$ of which an average is less than 3 are analyzed. Also, in 609, the following is analyzed: "Scattering test" in QualitySpecName described separately in PRX; "Defects" in QualityParameterSetType; and "RankDefects2" in Minimum AcceptableRank. The print quality requirements that "The inspection apparatus performs a test for scattering width. The minimum quality criterion is a scattering diameter of less than 3 mm and greater than or equal to 2 mm," are analyzed. The PRX analyzing unit 521 further determines whether to execute a prepress process based on the print quality requirements.

To meet the above-described print quality requirements that "The print control unit 541 performs a test on $\Delta E00$. The minimum quality criterion is $\Delta E00$ of which an average is less than 3.", the production system 120 prints a designated chart and measures the color of the chart. In the present embodiment, patches are inserted at an end of a sheet, and the measurement control unit 5411 incorporated in the production system 120 measures the colors of the patches, thus performing a color variation test. Specifically, a process of embedding a chart (for example, 54 patches) for Japan Color certification into PDF is performed. Therefore, the PRX analyzing unit 521 holds the details of the patch embedding process as an additional process to be performed during execution of a prepress process.

In the present embodiment, the example in which a process of embedding patches is performed is described; however, the configuration is not limited thereto. Alternatively, a patch chart in which only patches are arranged may be generated, and colors may be measured. In this case, an additional process does not need to be executed during execution of a prepress process, the color management unit of the production system 120 may generate a patch chart and read the patches. At this time, the PRX analyzing unit 521 saves the details of an instruction to the process management unit 522 so that the PRX analyzing unit 521 can provide an instruction to the process management unit 522 to generate a patch chart and read the patch chart in the production system 120.

In 610, the PRX analyzing unit 521 sends the information about the print quality requirements and prepress process analyzed from the PRX in 609 to the process management unit 522.

In 611, the process management unit 522 determines the production system 120 to actually perform production from among a plurality of the production systems 120 connected to the workflow management server 100 based on the product type received in 607 and the print quality requirements determined in 609. For example, in the case of photo book, after printing and binding by the production system 120, cutting is performed except for the binding edge. In the case of photo book for which adhesive binding is performed, the size of sheet for cover is twice the size of sheet for contents. Therefore, in the case of a photo book for which A5 is designated as finishing size and glossy paper is designated as paper type for the contents, cutting after printing and printing onto A4-size sheet for the cover are taken into consideration. At this time, the production system 120 that is capable of printing onto glossy paper of greater than or equal to A4 size is selected by the process management unit 522. A hard cover may be set as a cover for photo book, and the production system 120 selected as described above may not be able to print. In this case, PDF may be divided into a cover and contents, and a job for the cover and a job for the contents may be printed in a plurality of the production systems 120. The data management unit 525 holds the printing abilities of the production systems 120 under control of the workflow management server 100, and the process management unit 522 is able to acquire the printing abilities from the data management unit 525 as needed.

In the present embodiment, a production system is determined from the viewpoint of usable paper and whether to meet a quality request; however, the configuration is not limited thereto. For example, a production system may be determined based on the number of output sheets (the number of sets) of a print job and the productivity of each production system.

In 612, the process management unit 522 sends the PDF and product type received in 606 and the production system 120 determined in 611 to the prepress control unit 524 and provides an instruction for the prepress process. The instruction for the prepress process also contains the details of the prepress process, determined by the PRX analyzing unit 521 from the PRX in 609.

In 613, the prepress control unit 524 executes the prepress process in accordance with the prepress instruction received in 612. The details of the prepress process roughly contain two types. A first process is a prepress process that is determined based on a product type, a production system 120, and PDF. Specifically, the first process is an imposition process, or the like. For example, in the case of photo book containing a product type of finishing size A5, a print position is designated for a cover on A4 paper and for contents on A5 paper. For the cover, pages designated as the cover in PDF are imposed on both sides of an A4 sheet. For the contents, pages designated as the contents in PDF are imposed on both sides of A5 sheets in a designated page order.

As another example, when saddle stitch binding is designated, imposition is performed in a designated page order. A second process is a prepress process determined from the PRX in 609. The specific details of the second prepress process are already described in 609, so the description thereof is omitted.

In 614, a prepress processing unit sends the prepress-processed PDF generated in 613 to the process management unit 522.

In 615, the process management unit 522 creates JDF. For example, in the case of photo book, job information that means finishing size "A5", binding type "adhesive binding", contents paper type "glossy paper", and contents finishing "laminating" is set in JDF. When the print quality requirements analyzed by the PRX analyzing unit 521 in 609 and received in 610 contain a measurement test to be performed by the print control unit 541, the measurement instruction is set in JDF. In the present embodiment, since the print quality requirements contain "The print control unit 541 performs a test on ΔE00. The minimum quality criterion is ΔE00 of which an average is less than 3.", an instruction for causing the measurement control unit 5411 to perform measurement during a job is provided by JDF.

In 616, the color management unit 526 creates a pre-adjustment instruction based on the print quality requirements determined in 6092. The adjustment instruction describes pre-adjustment that is performed before the production system 120 starts production. Examples of the pre-adjustment include adjustment of registration on both sides and calibration in the production system 120. A quality requirement for adjustment of registration is a quality request that indicates the allowable range of misregistration of an image. In the present embodiment, the print quality requirements that. "The print control unit 541 performs a test on ΔE00. The minimum quality criterion is ΔE00 of which an average is less than 3" are set as the print quality requirements for photo book. Therefore, for example, as pre-adjustment to meet the quality request, a calibration instruction on a sheet (glossy paper) that the job uses is created as an adjustment instruction before the job starts. The adjustment instruction may be created as an adjustment instruction sheet to prompt an operator who manages the production system 120 to perform the adjustment, or information indicating the details of the adjustment instruction may be embedded in a job to cause the production system 120 to perform the adjustment.

In the present embodiment, the example in which registration adjustment on both sides and calibration are used as adjustment processes to meet a quality request is described; however, the configuration is not limited thereto. The adjustment process may be gray level correction, density correction, or adjustment peculiar to a printing apparatus and held for each paper (glossiness correction, adjustment of a transfer bias, or the like).

In 617, the process management unit 522 creates post-processing settings based on the print quality requirements determined in 609. The postprocessing settings indicate the type of post-process that is executed by the post-process control unit of the production system 120. For example, in the case of photo book, an instruction for adhesive binding as a binding method and laminating as contents finishing is created.

in 618, the process management unit 522 creates inspection settings based on the print quality requirements determined in 609. The inspection settings indicate the type and criteria of inspection that is executed by the inspection control unit 543 of the production system 120. In the case of the present embodiment, the print quality requirements "The inspection apparatus performs a scattering width test. The minimum quality criterion is a scattering diameter of less than 3 mm and greater than or equal to 2 mm." analyzed by the PRX analyzing unit 521 in 609 are created as inspection settings. However, inspection quality criteria are not limited to scattering and may include other quality criteria, such as maximum density, print misregistration, and the accuracy of finishing.

In 619, the process management unit 522 sends the PDF, the JDF, the adjustment instruction, the postprocessing settings, and the inspection settings to the data management unit 525 to send them to the production system 120.

In 620, the data management unit 525 sends the prepress-processed PDF created in 613, the JDF created in 615, and the adjustment instruction created in 616 to the print control unit 541.

in 6202, the color management unit 526 sends the pre-adjustment instruction created in 616 to the print control unit 541.

In 621, the print control unit 541 performs pre-adjustment on the PDF and JDF received in 620 in accordance with the pre-adjustment instruction created in 616. As described above, the pre-adjustment instruction may be created as a pre-adjustment instruction sheet to prompt an operator who manages the production system 120 to perform the pre-adjustment, or information indicating the details of the pre-adjustment instruction may be contained in a job to cause the production system 120 to execute the pre-adjustment.

In 622, the print control unit 541 analyzes measurement settings and job settings from the JDF received in 620. The measurement settings and job settings generated by the process management unit 522 in 615 are invoked.

In 623, the print control unit 541 executes a printing process based on the PDF and JDF received in 620. At this time, the measurement control unit 5411 performs measurement based on the measurement settings analyzed in 622.

In 6244, the print control unit 541 sends the measurement results obtained in 623 to the color management unit 526 of the workflow management server 100.

In 6324, the color management unit 526 creates PQX from the measurement results received in 6244. PQX created here is created by using the results measured by the print control unit 541 of the production system 120 based on the pre-adjustment instruction created by the color management unit 526 of the workflow management server 100. Therefore, not all the items of the PQX are created, but only the items associated with the function of pre-adjustment on color are created. The details of creating PQX will be described in 632.

In 6242, the color management unit 526 sends the measurement results received in 6244 and the PQX created in 6324 to the data management unit 525 of the workflow management server 100. The measurement results are used to generate PQX in the PQX generation unit 523 (described later). At this time, positions where colors are measured are also sent.

In 626, the postprocessing control unit 542 executes postprocessing based on the postprocessing settings created in 6174 when the postprocessing control unit 542 detects that printing completes and printed matter is set in the postprocessing apparatus 123. For example, in the case of photo book, a post-process, that is, adhesive binding and laminating, is performed on the printed matter printed in 623.

In 6326, the postprocessing control unit 542 creates PQX from the results of post-processing performed in 626. Since PQX to be created here is created by using the results of postprocessing performed by the postprocessing control unit 542 of the production system 120, not all the items of PQX are created, but only the items associated with the function of postprocessing are created. The details of creating PQX will be described in 632.

In 627, the postprocessing control unit 542 sends the results of postprocessing to the data management unit 525 of the workflow management server 100. The results contain the ID of the job that runs postprocessing and information indicating that post-processing is complete.

In 629, the inspection control unit 543 executes inspection based on the inspection settings received in 628. In the case of the present embodiment, the inspection control unit 543 executes inspection that "The inspection apparatus performs a scattering width test. The minimum quality criterion is a scattering diameter of less than 3 mm and greater than or equal to 2 mm." set in the inspection settings. Results of inspection are evaluated as OK (good product) or NG (defective product). In 630, the inspection control unit 543 sends the results of inspection o the data management unit 525 of the workflow management server 100.

In 6328, the inspection control unit 543 creates PQX from the results of inspection performed in 629. Since PQX to be created here is created by using the results of inspection performed by the inspection control unit 543 of the production system 120, not all the items of PQX are created, but only the items associated with the function of inspection are created. The details of creating PQX will be described in 632.

In 630, the inspection control unit 543 sends the results of inspection performed in 629 and the PQX to the data management unit 525 of the workflow management server 100. Although not described because it is publicly known, when there occurs a print product (defective product) that does not meet the criterion value of the inspection settings and the inspection control unit 543 determines the print product as NG, the workflow management server 100 instructs the production system 120 to reproduce a print product to compensate for the defective product.

In 631, the data management unit 525 sends the measurement results and PQX received in 6242, the results of postprocessing and PQX received in 627, and the results of inspection and PQX received in 630 to the PQX generation unit 523.

In 632, the PQX generation unit 523 creates PQX containing all the items associated with the print job from the measurement results and PQX, the results of postprocessing and PQX, and the results of inspection and PQX, received in 631.

First, the outline of PQX to be generated in this process will be described. As illustrated in FIG. 8, PQX is composed of pieces of information on production, such as Message-Info, PrinterInfo, InkCollection, and SampleCollection. Typical fields in PQX will be described. SampleCollection is composed of a collection of Samples that are fields on production report information. ColorReport indicates report information on color, DefectReport indicates report information on image defect. In the present embodiment, description will be made on the assumption that part of SampleCollection is used; however, the configuration is not limited thereto. Another field of PQX may be used.

As an example of first Sample, there is ColorReport. In the present embodiment, in 623, the print control unit 541 measures the colors of printed matter during the job. The measurement results and the measured positions are received via the data management unit 525 in 631, and report information on color is created. For example, positions at which colors are measured by the print control unit 541 are described in PositionOnSample. Specific colorimetry results are saved in CxF format, and ColorReport and the colorimetry results are associated by CxFSampleObjectIdLink.

As an example of second Sample, there is DefectReport. In the present embodiment, in 629, the inspection control unit 543 inspects printed matter during the job. The results of inspection and the inspected positions are received via the data management unit 525 in 631, and report information on image defect is created. For example, a position at which an image defect is detected by the inspection control unit 543 is described in PositionOnSample. The size of an image defect is described in DefectXMeasure, DefectYMeasure, and DefectUoM. The number of image defects is described in DefectCount.

In 633, the PQX generation unit 523 sends the PQX created in 632 o the data management unit 525.

In 634, the data management unit 525 sends the PQX received in 633 to the data management unit 504 of the order receiving system server 110.

in 635, the data management unit 504 saves the PQX received in 634 in the data management unit 504. The PQX saved here can be browsed by the manager of the order receiving system server 110 or be on public view to end users via other systems as needed.

In the present embodiment, the workflow management server 100 creates print quality requirements by analyzing the PRX received from the order receiving system server 110 and sends the print quality requirements to the production system 120. The production system 120 provides an instruction for adjustment, postprocessing, or inspection in the control units based on the received print quality requirements. The production system 120 sends the results of the processes in the instructed control units to the workflow management server 100. The results of each process are generated in compliant with the PQX format and sent. The PQX is information that indicates the degree of quality of an actual print product for the quality requirements requested by the PRX.

With the above configuration, work for producing a print product that meets quality terms requested by a customer is automated with an information format for transferring quality terms or a quality report. Therefore, it is possible to suggest manual setting of a print job such that the quality terms are satisfied, so the efficiency of a workflow process can be achieved.

With the above configuration, for a quality request from each of end users that are various for each job received as an order, quality check is performed while set quality adjustment can be performed, so quality satisfaction for each job can be efficiently increased.

With the above-described configuration, the workflow management server 100 outputs a quality request compliant with a common information format, such as PRX, to the production system 120. Therefore, a certain quality request can be provided without influence of a difference in the vendor, model, or the like, of the production system 120.

In the present embodiment, the printing apparatus 121 is described as an example of the production system 120; however, the configuration is not limited thereto. The entire production system that performs reception of orders to production is applicable.

Second Embodiment

Because customers do not become conscious, no request is provided in PRX; however, there are important items to judge print quality. There are many cases where requirements other than requirements requested by PRX are present, such as adjustment and inspection items according to print quality assurance that printing companies are performing in accordance with their own operation criteria.

For example, generally, for items such as a tone contained in a print product and a deviation in position at the time of binding, customers easily realize and are highly likely to be contained in PRX as quality requirements. On the other hand, for example, image quality items such as the maximum toner density and toner graininess indicating a husky feeling of printed matter are not contained in instructions from customers, but such image quality items can be performed by printing companies voluntarily as part of items to be performed in inspection work for quality management.

For the prospect of a future re-printing request, or the like, there are cases where PQX is generated for the purpose of recording information, such as an image defect and a missing leaf, found during inspection in order for not customers but printing companies to use the PQX.

As the above-described examples, not only result information on quality requirements requested in PRX is generated as PQX but also information about adjustment and inspection items to be performed in the control units of a production system is added to PQX. Therefore, quality satisfaction can be effectively increased for customers and printing companies.

In the present embodiment, a mode in which, for quality items different from quality items requested as PRX as well, the production system 120 sends a report indicating the quality of a print product to the workflow management server 100 in PQX format will be described.

A system configuration according to the present embodiment is similar to that described in the first embodiment, so the description is omitted.

FIG. 9 is a diagram that shows the software configuration of the production system 120 according to the present embodiment. The order receiving system server 110 and the workflow management server 100 are the same as those of the first embodiment, and, therefore, not shown in the drawing. Here, only the difference from the configuration described with reference to FIG. 5A to FIG. 5C in the first embodiment will be described. A major difference from the first embodiment is that a PQX generation unit for generating PQX from results obtained as a result of execution of various controls is provided in each control unit of the production system 120.

The print control unit 541 includes a PQX generation unit 5413. The PQX generation unit 5413 creates PQX data from the results of control executed based on the pre-adjustment instruction set by the PRX analyzing unit (printing) 5412 and the results of control that an operator performs in accordance with the operation regulations of a printing factory.

The postprocessing control unit 542 includes a PQX generation unit 5422. The PQX generation unit 5422 creates PQX data from the results of control executed based on the postprocessing instruction set by a PRX analyzing unit (postprocessing) 5412 and the results of control that the operator performs in accordance with the operation regulations of the printing factory.

The inspection control unit 543 includes a PQX generation unit 5432. The PQX generation unit 5432 creates PQX data from the results of control executed based on the inspection settings instruction set in the PRX analyzing unit (inspection) 5431 and the results of control that the operator performs in accordance with the operation regulations of the printing factory.

FIG. 10A to FIG. 10D are a set of sequence diagrams that illustrate software processing according to the present embodiment. Here, only the difference from the sequence described with reference to FIG. 6A to FIG. 6D in the first embodiment will be described.

A major difference from the first embodiment is that, in each control unit of the production system 120, after settings of each control are created from a print quality request, settings to be performed in accordance with the operation regulations of the printing factory are edited to be added. Also, the difference is that various controls are executed based on the edited settings and then PQX is generated.

The postprocessing control unit 542 creates postprocessing settings in 6174 and then, in 6175, adds other postprocessing settings in accordance with the printing factory operation regulations. Other settings are, for example, settings such as how an output sheet printed in a state where multiple pages are imposed on a single sheet is cut. The settings depend on the configuration of the printing system of the printing company, so there are many cases where the settings are determined for printing company's convenience. In such cases, settings of cutting are not contained in the postprocessing settings created in 6174. Control settings set in 6175 for performing appropriate cutting by using the cuttable postprocessing apparatus 123 are, for example, set and cataloged from an input part (not shown) of the postprocessing apparatus 123 by an operator in advance.

Based on the postprocessing settings edited in 6175, the postprocessing control unit 542 performs postprocessing in 626.

Subsequently, in 6326, the PQX generation unit 5422 generates PQX data from the results of postprocessing performed in 626. PQX data to be generated here uses, for example a RegistrationReport field of SampleCollection.

The inspection control unit 543 creates inspection settings in 6184 and then, in 6185, adds other inspection settings in accordance with the printing factory operation regulations. Other settings are, for example, settings for testing maximum density or graininess of toner to be used for printing. According to the characteristics of toner to be used in the printing apparatus 121 or the type of paper to be used for printing, a maximum density or graininess target variously changes. For this reason, there are case where such other settings may not be contained in inspection settings to be generated in 6184. Inspection settings to be set in 6185 are, for example, set and cataloged from an input part (not shown) of the inspection apparatus 124 by an operator in advance. Alternatively, such other settings may be set and cataloged as one of items to be inspected for visual checking by a checker who performs inspection.

Based on the inspection settings edited in 6185, the inspection control unit 543 performs an inspection process in 629. An inspection process to be performed may be performed as a method for visual checking by a checker.

Subsequently, in 6328, the PQX generation unit 5432 generates PQX data from the results of the inspection process performed in 629. PQX data to be generated here uses, for example, the DefectReport field of SampleCollection.

With the above configuration, a print quality report that not only a customer who inputs a print quality request but also a print manager (for example, a person in charge in a printing company) who manages a printing process requests can be generated. Therefore, quality management highly convenient for users who engage in a printing system including an order receiving system, a workflow management system, and a production system can be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments) and/or that includes one or more circuits application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), car Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-088596, filed May 8, 2019, which is hereby incorporated by reference herein in its entirety.

The invention claimed is:

1. A printing system including an information processing apparatus and a production system, the information processing apparatus being able to communicate with an external apparatus and the production system,
the information processing apparatus comprising:
at least one processor that causes the information processing apparatus to function as:
a receiving unit configured to receive print data and quality request data from the external apparatus;

an interpretation unit configured to interpret the received quality request data;

a processing unit configured to perform image processing of the received print data based on an interpretation result of the quality request data interpreted by the interpretation unit;

a print data sending unit configured to send the print data on which the image processing is performed to the production system; and a quality request data sending unit configured to send the quality request data to the production system, and the production system comprising:

an inspection unit for inspecting a print product printed based on the print data by the production system and the quality request data.

2. The printing system according to claim 1, wherein the quality request data includes a color quality request indicating an allowable range of a color difference of a color value of an image of a product with respect to a reference value.

3. The printing system according to claim 1, wherein the quality request data includes a registration quality request indicating an allowable range of a misregistration of an image with respect to a reference position.

4. The printing system according to claim 1, wherein the quality request data includes an image defect quality request indicating an allowable range of an image defect.

5. The printing system according to claim 1, wherein the quality request data includes a bar code quality request indicating an allowable range of quality of a bar code that is printed on the print product.

6. The printing system according to claim 1, wherein the quality request data sent by the quality request data sending unit includes an instruction to perform calibration to the production system.

7. The printing system according to claim 1, wherein the receiving unit is configured to receive quality request data in a data format compliant with Print Requirement eXchange format (PRX).

8. A control method for a printing system including an information processing apparatus and a production system, the information processing apparatus being able to communicate with an external apparatus and the production system, the control method comprising:

receiving, by the information processing apparatus, print data and quality request data from the external apparatus;

interpreting, by the information processing apparatus, the received quality request data;

performing, by the information processing apparatus, image processing of the received print data based on an interpretation result of the quality request data;

sending, by the information processing apparatus, the print data on which the image processing is performed to the production system;

sending, by the information processing apparatus, the quality request data to the production system; and inspecting, by the production system, a print product printed based on the print data and the quality request data.

9. A non-transitory computer readable storage medium storing a program causing a computer to execute a control method for a printing system including an information processing apparatus and a production system, the information processing apparatus being able to communicate with an external apparatus and the production system, the control method comprising:

receiving, by the information processing apparatus, print data and quality request data from the external apparatus;

interpreting, by the information processing apparatus, the received quality request data;

performing, by the information processing apparatus, image processing of the received print data based on an interpretation result of the quality request data;

sending, by the information processing apparatus, the print data on which the image processing is performed to the production system;

sending, by the information processing apparatus, the quality request data to the production system; and inspecting, by the production system, a print product printed based on the print data and the quality request data.

* * * * *